United States Patent [19]

Asai et al.

[11] Patent Number: 5,491,030
[45] Date of Patent: Feb. 13, 1996

[54] SURFACE FINISHING FOR METAL MOLDINGS

[75] Inventors: Shigesaburo Asai; Tetsuya Sakagami, both of Shizuoka, Japan

[73] Assignee: Asahi TEC Corporation, Shizuoka, Japan

[21] Appl. No.: 82,295

[22] Filed: Jun. 28, 1993

[30] Foreign Application Priority Data

| Jun. 26, 1992 | [JP] | Japan | 4-169234 |
| Jun. 26, 1992 | [JP] | Japan | 4-169235 |
| Jun. 26, 1992 | [JP] | Japan | 4-169236 |
| Jun. 26, 1992 | [JP] | Japan | 4-169237 |
| Sep. 4, 1992 | [JP] | Japan | 4-236838 |
| Sep. 18, 1992 | [JP] | Japan | 4-248417 |
| Sep. 30, 1992 | [JP] | Japan | 4-261252 |

[51] Int. Cl.$^6$ .................................................. B32B 9/00
[52] U.S. Cl. ............................ 428/433; 428/212; 428/429; 428/450; 428/458; 428/461; 428/463; 427/388.1; 427/388.2; 427/409
[58] Field of Search ...................... 428/458, 461, 428/462, 463, 447, 450, 212, 429, 433, 424.2; 427/388.1, 388.2, 409

[56] References Cited

U.S. PATENT DOCUMENTS

| 4,895,887 | 1/1990 | Daimon et al. | 524/265 |
| 4,911,954 | 3/1990 | Tatsuno et al. | 427/409 |
| 5,034,262 | 7/1991 | Komatsu et al. | 428/212 |

*Primary Examiner*—Patrick J. Ryan
*Assistant Examiner*—Abraham Bahta
*Attorney, Agent, or Firm*—Sughrue, Mion, Zinn, Macpeak & Seas

[57] ABSTRACT

A vehicle wheel having a polished design surface coated with a transparent coating which is mainly composed of inorganic material. The surface roughness should be 3 μm or less in centerline mean surface roughness, and have a mean value of dendrite secondary arm spacing less than or equal to 40 μm.

3 Claims, 12 Drawing Sheets

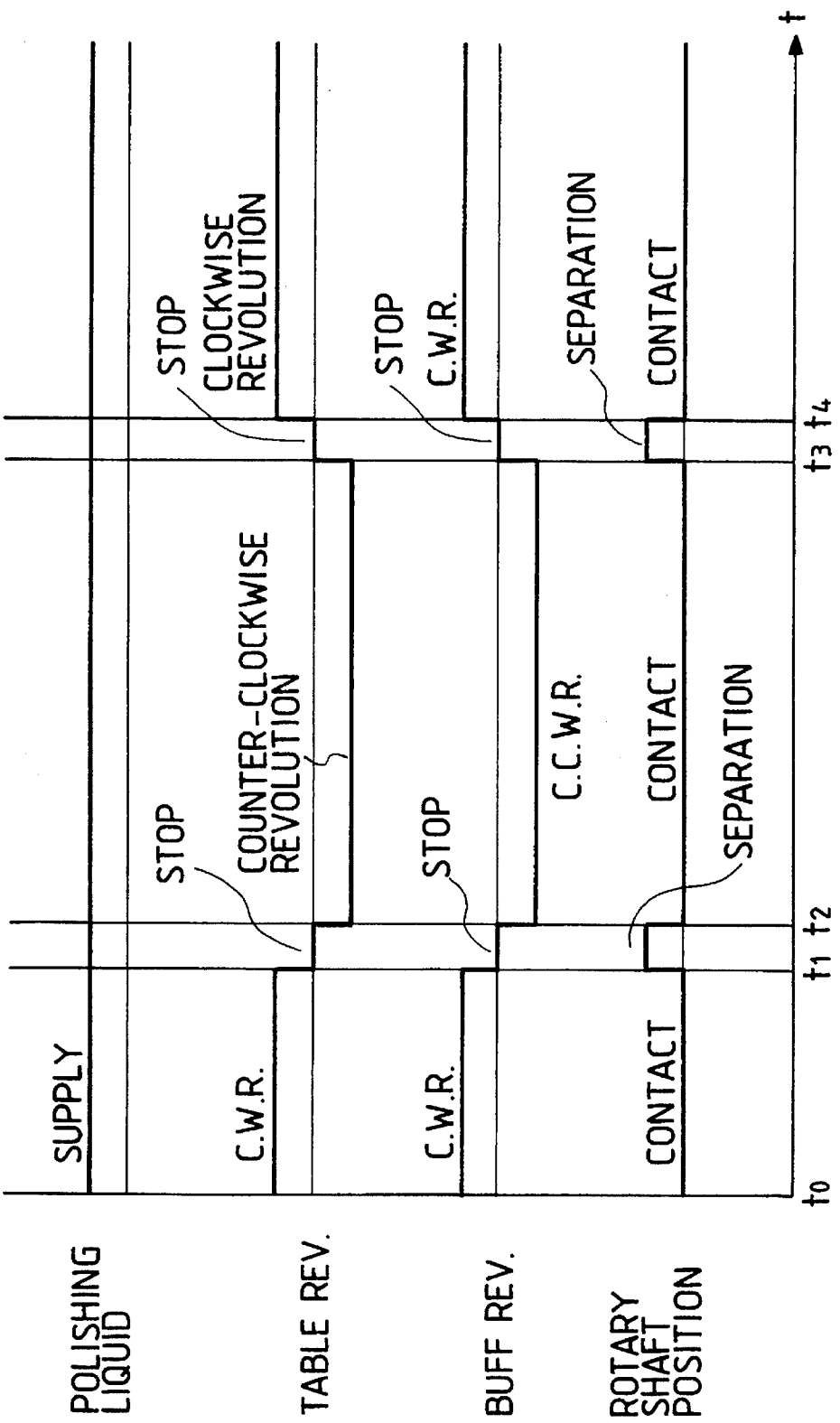

SURFACE FINISHING FOR METAL MOLDINGS

BACKGROUND OF THE INVENTION

The present invention relates to finishing surfaces for metal molded products, such as for a vehicle wheel.

Metal products having well finished surfaces with a bright shine or lustre require the use of expensive metals. In addition, surface finishing is usually done by hand, i.e., manually.

Today's industrial mass production techniques are, however, premised on the use of various working machines, and when a decision is made as to how to finish the surfaces of metal products, it is therefore important to determine whether the method can be used as a mass-production technique.

With respect to surface finishing of metal products, a mechanical mass-production technique for making plate materials or the like having flat and extremely well finished surfaces has been established and carried out widely.

With respect to the surfaces of molded products such as cast products, forged products, or the like, however, uneven portions exist on the surfaces so that it is difficult to mechanically finish the surfaces, particularly the concave portions. Accordingly, finishing is typically performed by hand rather than mechanically.

Since vehicle wheels are part of the overall appearance of a vehicle, the appearance of design surfaces of the wheels is regarded as extremely important from a commercial point of view.

In one conventional method, a design surface of a vehicle wheel formed through molding, such as by casting or forging, is given a bright finish in order to improve the wheel's appearance.

Since vehicle wheels can be damaged by stones or other debris, a transparent coating is formed on the brightly finished design surface so that the design surface can be protected.

However, transparent coatings are not perfectly transparent, and the brightness of the design surface is therefore diminished.

Conventionally, the finishing of such a design surface is sufficiently bright so as to be recognized by human eyes through the transparent coating formed on the surface.

Recently, the transparency of transparent coatings has been improved with advances in techniques for applying such transparent coatings. However, minute defects on the design surface caused by the finishing process, or by the unevenness of the finishing, can be recognized as a result of the improvements in the transparency of the transparent coatings. That is, the improved transparent coatings allow defects to be seen and may adversely affect the appearance of the wheels.

BRIEF DESCRIPTION OF THE DRAWINGS

FIG. 10 is a timing chart showing the operation of a wet buffing method according to the present invention.

SUMMARY OF THE INVENTION

Figure 1:
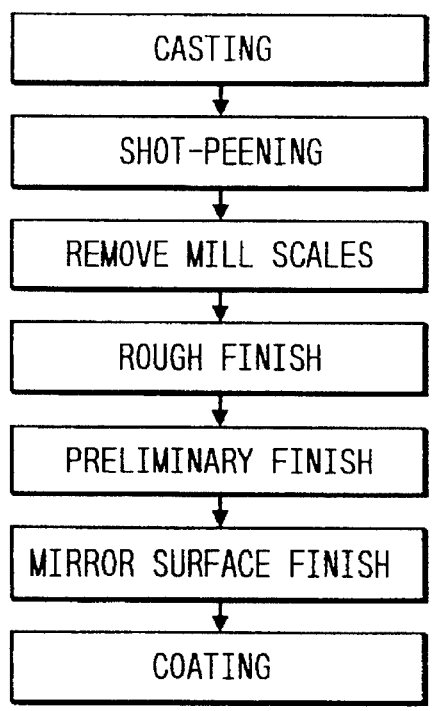
FIG. 1 is a flow chart illustrating the steps in the process of finishing a surface.

In order to attain the foregoing objects, the invention provides a method for surface finishing metal molded products, characterized in that the surface finishing step finally performed on a metal molded product includes a first polishing step in which a buffing device having a transverse rotation axis and a soft buff is used so that the circumferential surface of the buff contacts the surface of the metal molded product while supplying an abrasive liquid.

The present invention has been made in view of the aforementioned deficiencies in the art, and an object thereof is to provide a surface finishing method for mechanically finishing the surfaces of metal molded products which were previously finished only by hand, and which produces molded products having an extremely well finished surface.

According to a primary aspect of the invention, there is provided a method for producing a vehicle wheel having a polished design surface coated with a transparent coating, comprising the following steps of:

producing a vehicle wheel having a design surface thereon; and coating said design surface with transparent composite material which is mainly composed of inorganic material.

A surface roughness on said design surface of said vehicle wheel is preferably not greater than 3 μm in terms of centerline average roughness.

The vehicle wheel comprises aluminum alloy containing silicon.

According to the present invention, there is also provided a vehicle wheel having a polished design surface coated with a transparent coating, wherein the vehicle wheel is coated with transparent composite material which is mainly composed of inorganic material.

DETAILED DESCRIPTION OF THE PREFERRED EMBODIMENTS

The present invention will be described below with reference to an embodiment illustrated in the drawings. In this embodiment, the technique of the present invention is applied to light-alloy articles such as vehicle wheels which are cast products of an aluminum alloy. In this specification, the design surface means a surface which faces outward from a vehicle body and forms a part of the overall appearance of a vehicle.

First, a vehicle wheel blank 1 as a molded product is obtained by pouring a molten aluminum alloy (for example, AC4CH) (containing silicon) into a mold having a predetermined shape.

The vehicle wheel blank 1 is taken out of the mold and subjected to a process of shot peening after removal of gate portions.

The working conditions in this shot peening are established, for example, as shown in Table 1.

TABLE 1

| Kind of Shot | steel balls or steel wire chips |
|---|---|
| Size of Shot | equivalent to 0.8 to 1.2 mmφ |
| Spraying | air spraying |
| Air Pressure | 5.2 to 6.0 kg/cm² |
| Speed of Spraying | not less than 80 m/sec |
| Quantity of Projection | 400 to 600 kg/min |

Although shot peening is performed all over the vehicle wheel blank 1 for 20 minutes under such conditions, shot peening in the portion of a design surface 2 of the vehicle wheel blank 1 is performed particularly carefully since a transparent coating 31 is to be formed on the design surface in this embodiment as described later.

Shot peening is a process having a comparatively high degree of freedom, so that it possible to spray shots almost uniformly all over the curved design surface 2 to thereby form a plastic deformation layer uniformly.

The design surface 2 of the vehicle wheel lank 1 subjected to such shot peening becomes a minute matte-finished rough surface, and a plastic deformation layer is formed in its superficial portion.

Since this plastic deformation layer is formed by the impact of shots, the plastic deformation layer opens to the design surface 2 of the vehicle wheel blank 1, so that holes or cracks such as bubbles containing air or moisture therein disappear by being compressed in the plastic deformation layer, and air contained in such holes, water used in the working of casting the vehicle wheel blank 1, and so on, are exhausted outside.

Shot peening in this embodiment involves high speed spraying of the shot and levels of high kinetic energy, so that the thickness of the plastic deformation layer is relatively large, e.g., about 1.5 -P to 3.0 -P. The plastic deformation layer formed in the superficial portion of this design surface 2 is substantially free of air or moisture.

Even if preliminary finishing or mirror finishing, which will be described later, is performed by wet buffing, moisture will not remain in the superficial portion of the design surface 2 so as to become a hindrance to the formation of the transparent coating 31.

Shot peening can be performed under any conditions including those mentioned above.

Further, since shot peening involves spraying shots to impact the surface of the vehicle wheel blank 1, it is possible to remove and eliminate mill scale, adhering foreign matters, and dirt or the like from the surface of the vehicle wheel blank 1 thereby making the surface clean.

Next, the vehicle wheel blank 1 is machined so as to be formed into a predetermined accurate shape as the vehicle wheel blank 1.

The design surface 2 of the vehicle wheel blank 1 is then subjected to various steps shown in FIG. 1 so that a vehicle wheel having the design surface 2 (i.e., a bright mirror-finished surface) is obtained.

Figure 3:
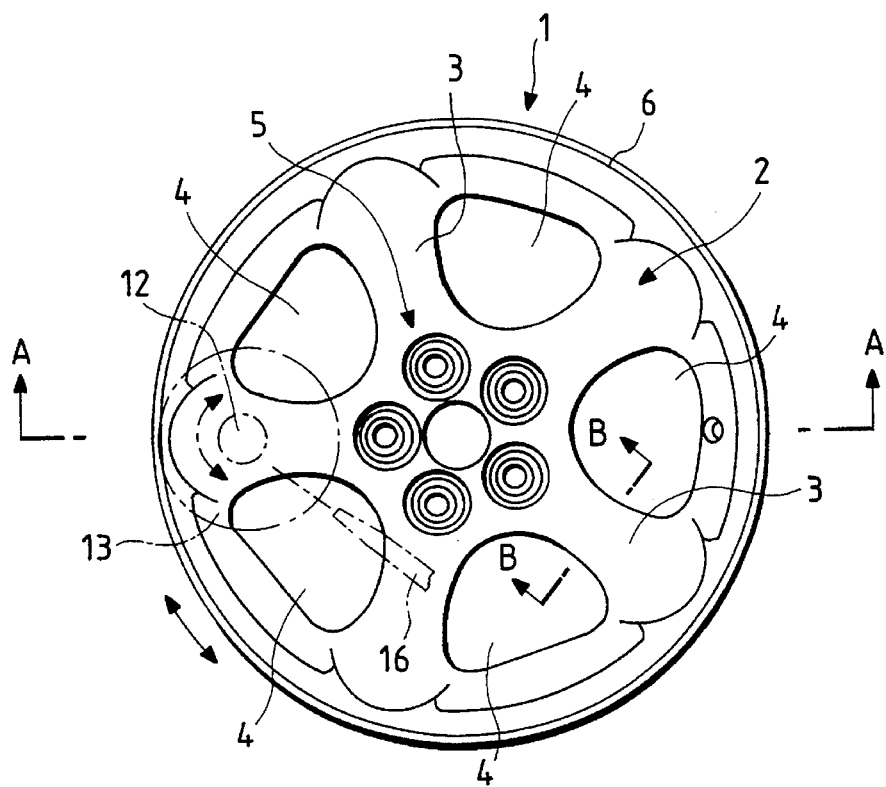
FIG. 3 is a top view of a wheel illustrating a step of longitudinal-axis wet buffing.
Figure 4:
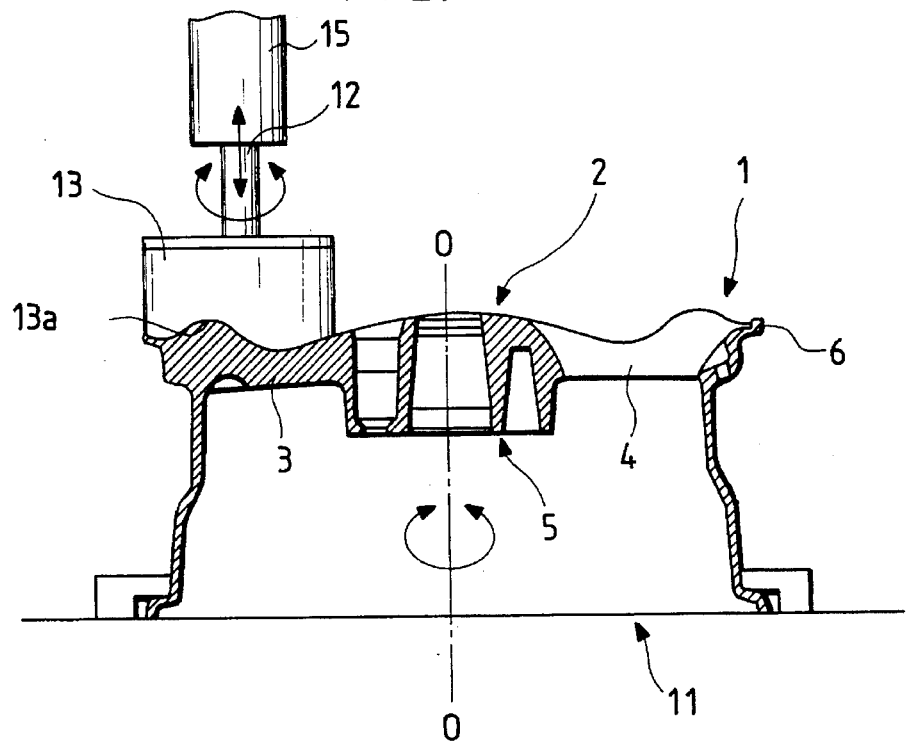
FIG. 4 is a cross-sectional view taken along line A—A of FIG. 3.

The vehicle wheel blank 1 in the above-mentioned state has a number of uneven portions formed by spokes 3, through holes 4, hub portions 5, rim portions 6 and so on (see FIGS. 3 and 4). Mill scale is left to some extent on this design surface 2.

The mill scale must be removed from the design surface 2.

The step of removing mill scale in this embodiment is performed gradually with a grinding machine using abrasive paper having a grit of about #100 to #320. In accordance with the size and shape of the roughness of the design surface 2, a rotor having the same size may be used instead, or hand polishing may be carried out in addition thereto.

The method of removing mill scale is not limited to using abrasive paper, but any other method may be used if it is possible to obtain the same quality finished surface.

A step of rough finishing is performed on the design surface 2 of the vehicle wheel blank 1 after the step of removing mill scale.

This step of rough finishing is performed by so-called dry buffing (i.e, without using any abrasive liquid) through divisional stages, for example, two stages.

The first state of this rough finishing step is performed at a high rotation speed, for example, of about 2000 rpm by use of a sisal buff and a half finishing compound.

The second stage of the rough finishing step is performed at the same rotation speed as mentioned above by use of a cotton buff having a smaller rigidity than the above-mentioned sisal buff, and an extremely superior finishing compound.

Upon completion of the rough finishing step, the design surface 2 has a finished surface equivalent to those conventionally attained on molded products by mass production using a machine.

The next embodiment requires a step of preliminary finishing and a step of mirror finishing upon the design surface 2 of the vehicle wheel blank 1 previously subjected to the step of rough finishing. In this embodiment, it is possible to mechanically attain mirror finishing which previously could only be attained on a molded product by a skilled worker working by hand.

Figure 2:
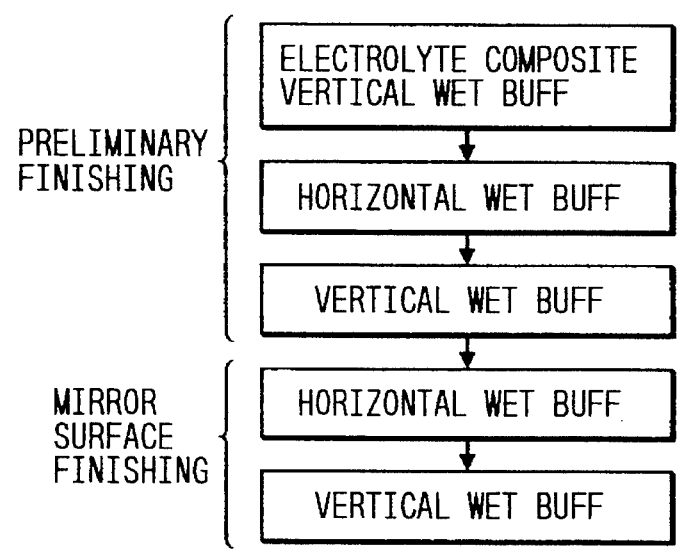
FIG. 2 is a flow chart illustrating a polishing step including the steps of preliminary and mirror surface finishing.

These steps of preliminary finishing and mirror finishing are carried out by wet buffing with an abrasive liquid through 5 divisional stages as shown in FIG. 2.

As the first stage of the step of preliminary finishing, a step of electrolysis composite-type longitudinal-axis wet buffing is performed upon the design surface 2 of the vehicle wheel blank 1 which has been previously finished by the above-mentioned rough finishing.

The steps for electrolysis composite-type longitudinal-axis wet buffing are as follows (with reference to FIGS. 3, 4 and 8).

The vehicle wheel blank 1 is fixed on a rotary table 11 so that its center is made to coincide with the rotation center O of the rotary table 11 and the design surface 2 is fixed in an upward and horizontal attitude. Then, the design surface 2 is polished by the lower end surface of a buff 13 attached to the lower end portion of a rotation shaft 12 extending vertically downwards.

The rotary table 11 is driven to rotate at a low speed and the portion to be worked by the buff 13 is displaced circumferentially and sequentially. In this embodiment, the rotating direction of the rotary table 11 is reversed at desired time intervals (for example, every 30 seconds).

The buff 13 is formed of an extremely soft material in comparison with a conventional buff. In this embodiment, for example, a continuous bubble sponge material having a large expansion ratio (for example, 3 to 5) is used. The buff 13 is not limited to a sponge material, but may be any other material so long as it is as soft as the sponge material.

The lower end surface of the buff 13 maintains contact with the design surface 2 in spite of the presence of uneven portions in the design surface 2, as shown in FIG. 4.

The urging force of the buff 13 against the design surface 2 is small, for example, not larger than 1 kgf/cm$^2$.

An electrode 14 having a shape corresponding to the shape in plan of the buff 13 is provided in the upper portion of the buff 13 (with reference to FIG. 8), and this electrode 14 is used for performing an electrolytic working function described later.

The rotation shaft 12 supporting the buff 13 on its lower end portion is held by an elevator 15 constituted by an oil pressure cylinder and other components. The rotation shaft 12 is driven, for example, at a rotation speed of 300 rpm so that the rotation speed of the buff 13 is made to be extremely low, i.e., not higher than about 10 m/sec. In this embodiment, the rotation speed is 4 m/sec.

The rotation speed is low because the above-mentioned soft material must remain constituting the buff deformable to follow and contact the uneven portions of the design surface 2.

This rotation shaft 12 is driven to rotate in the direction which is coincident with the rotating direction of the rotary table 11, and if the rotating direction of the rotary table 11 is reversed to the opposite direction, the rotation shaft 12 is pulled up by the elevator 15 so that the buff 13 moves upward away from the design surface 2, and the rotation shaft 12 is then driven to rotate in the opposite direction.

The rotating directions of the rotary table 11 and the buff 13 are always coincident.

A shaft hole 12a is formed in the rotation shaft 12 (FIG. 8), so that an abrasive liquid containing an abrasive can be supplied to the center portion of the buff 13 through this shaft hole 12a. This abrasive liquid functions an as electrolyte during electrolytic working which will be described later, and the abrasive liquid is an aqueous solution containing an abrasive of alumina of 10 µm in particle diameter, as well as a surface active agent added thereto.

As shown by a phantom line in FIG. 3, an abrasive liquid nozzle 16 is used for supplying the same abrasive liquid as mentioned above to a contact portion between the buff 13 and the design surface 2.

Supply of the abrasive liquid from the abrasive liquid nozzle 16 is continued even when the rotating direction of the rotary table 11 is reversed. Thus, the abrasive liquid is sprayed directly under the buff 13, even when the buff is raised in accordance with the reversal of the rotating direction of the rotary table 11. It is therefore possible to effectively eliminate buffing dusts and other foreign matters which accumulate between the buff 13 and the design surface 2.

Figure 8:
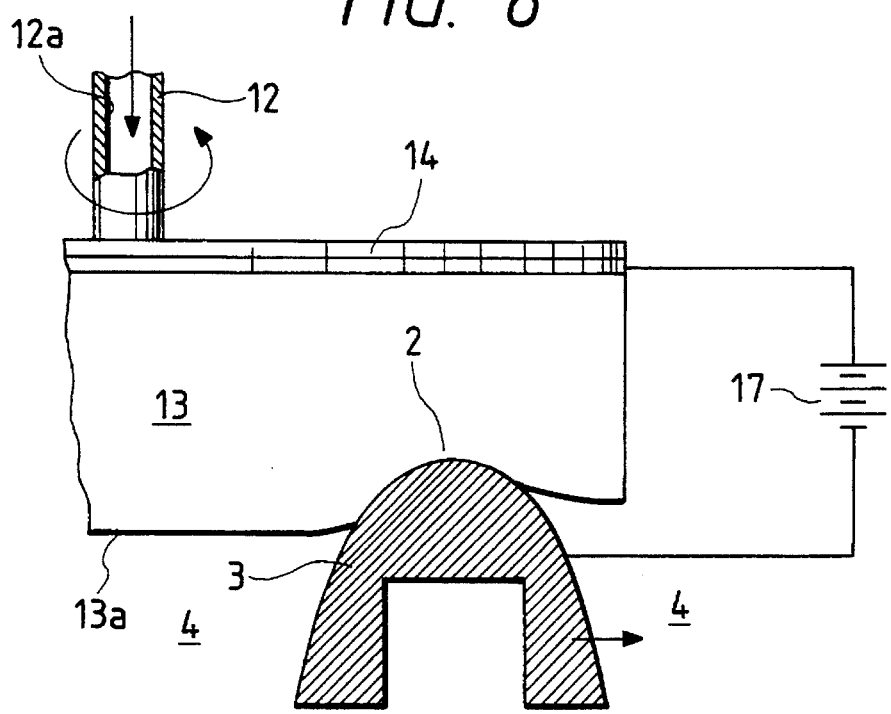
FIG. 8 is a cross-sectional view along line B—B of FIG. 3, showing a step of electrolysis composite-type longitudinal-axis wet buffing.

Electrolysis working in this step of electrolysis composite-type longitudinal-axis wet buffing is performed in combination with the above-mentioned longitudinal-axis wet buffing as shown in FIG. 8.

Electrolysis working is performed with a DC power supply 17 interposed between the electrode 14 and the vehicle wheel blank 1 and the above-mentioned abrasive liquid, and the electrode 14 and the design surface 2 of the vehicle wheel blank 1 are connected to the positive and negative sides, respectively.

The abrasive liquid supplied from the shaft hole 12a of the rotation shaft 12 and the abrasive liquid supplied from the abrasive liquid nozzle 16 are present between the electrode 14 and the design surface 2 and penetrate the buff 13 formed of a continuous bubble sponge material. An electrolytic circuit is therefore formed by the abrasive liquid, so that electrolysis working is performed in the design surface 2 at the same time as the above-mentioned buffing with the abrasive, and electrolysis composite-type buffing is thereby performed.

In this step of electrolysis composite-type longitudinal-axis wet buffing, therefore, the working efficiency is superior to that in ordinary buffing.

After completion of this step of electrolysis composite-type longitudinal-axis wet buffing, a step of transversal-axis wet buffing is performed on the design surface 2. In order to avoid confusion in the following description, this step of transversal-axis wet buffing will be referred to as a step of preliminary finishing transversal-axis wet buffing hereinafter.

Figure 5:
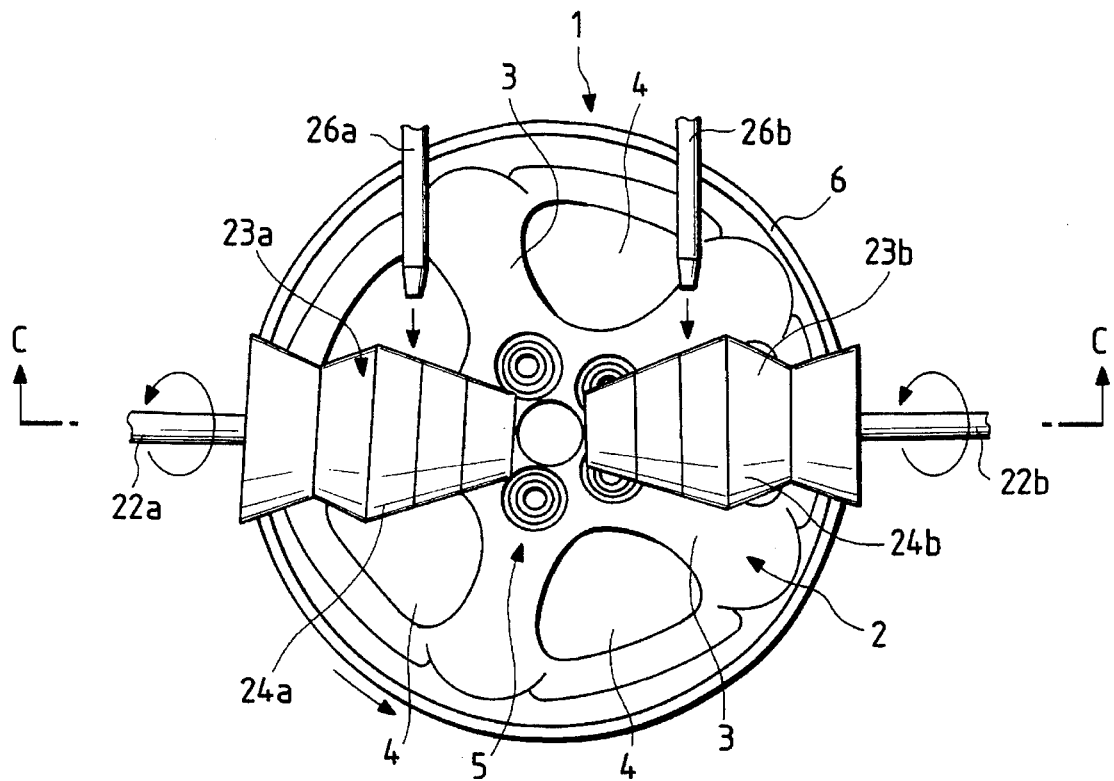
FIG. 5 is a top view of a wheel illustrating a step of transversal-axis wet buffing.
Figure 6:
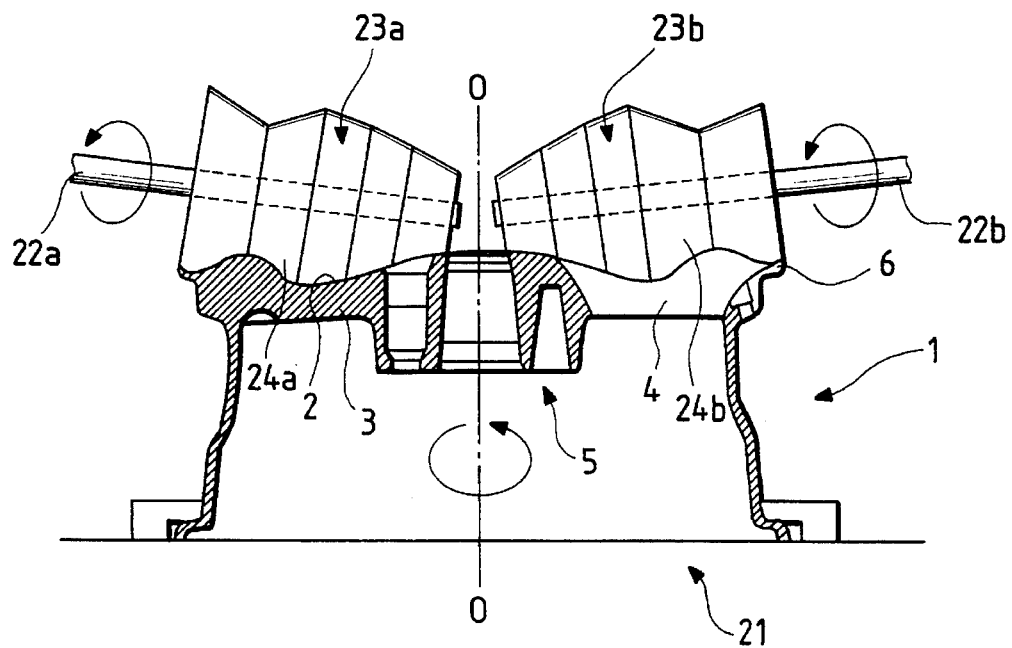
FIG. 6 is a cross-sectional view taken along line C—C of FIG. 6.

The steps for preliminary finishing transveral-axis wet buffing are as follows (with reference to FIGS. 5, 6 and 7).

The vehicle wheel blank 1 is fixed on a rotary table 21 so that its center is made coincident with the rotation center O of the rotary table 21, and the design surface 2 is fixed in an upward facing and horizontal attitude. The design surface 2 is polished by the circumferential surfaces of buffs 23a and 23b attached to rotation shafts 22a and 22b which extend substantially parallel to the design surface 2 from both the right and left sides.

The rotary table 21 is driven to rotate only in a predetermined direction at a low speed at the time of working, while the portion worked by the buffs 23a and 23b is displaced sequentially in the circumferential direction.

The buffs 23a and 23b are formed of a soft material, for example, in this embodiment, an independent bubble urethane foamed material having a large expansion ratio (for example, 3 to 5). Any other material may be used for these buffs 23a and 23b so long as it is as soft as the material mentioned above.

In this embodiment, the buffs 23a and 23b are made of a lamination of a plurality (5 in the illustrated case) of sheets of buff material of the required thickness which are penetrated by the rotation shafts 22a and 22b. The circumferential shape of each of the buffs 23a and 23b is made to approximate the shape of the radial cross-section shape of the design surface 2 (with reference to FIG. 6).

The buffs 23a and 23b are thus able to maintain linear contact with the design surface 2 in its radial direction in spite of the presence of uneven portions in the radial direction of the design surface 2.

Since the buffs 23a and 23b maintain linear contact with the design surface 2 in the step of preliminary finishing transversal-axis wet buffing, the polishing force by the supplied abrasive is relatively large, as will be described later. It is therefore possible to effectively delete electrolysis traces caused by the above-mentioned step of electrolysis composite-type longitudinal-axis wet buffing.

The buffs 23a and 23b have transversal axes, and their contact portions with the design surface 2 are circular arcs, so it is comparatively easy for the buffs 23a and 23b to penetrate deeply into concave portions formed on the design surface 2 to polish the inside of the concave portions.

Since these buffs 23a and 23b have linear contact with the design surface 2, if the buffs 23a and 23b are set onto the design surface 2 to be given flexibility in advance, the circumferential surfaces of the buffs 23a and 23b can contact with the concave portions on the design surface 2 surely by releasing the flexibility as will be described later.

In this step of preliminary finishing transversal-axis wet buffing, the rotation speed of the rotation shafts 22a and 22b is, for example, 100 to 500 rpm, and a low speed of 0.8 to 10 m/sec so that the soft buffs 23a and 23b contact the concave portions by releasing their flexibility in the same manner as in the step of electrolysis composite-type longitudinal-axis wet buffing.

In this embodiment, the rotation shaft 22a is driven to rotate in the direction coincident with the rotating direction of the rotary table 21, and opposite to the rotating direction of the other rotation shaft 22b.

Further, abrasive liquid nozzles 26a and 26b are provided respectively at the sides of the buffs 23a and 23b where the buffs first contact the design surface 2.

The abrasive liquid sprayed and supplied from these abrasive liquid nozzles 26a and 26b is the same as that mentioned above, i.e., a solution including alumina having a particle diameter of 10 μm, and a surface active agent added thereto, to thereby supply fresh abrasive to the buffs 23a and 23b.

In this step of preliminary finishing transversal-axis wet buffing, the contact areas between the buffs 23a and 23b and the design surface 2 are linear as has been described, so it is not only possible to supply fresh abrasive into the contact areas by spraying from the abrasive liquid nozzles 26a and 26b, but it is also possible to easily wash away foreign matter such as buffing dusts by the sprayed abrasive liquid.

The design surface 2 can be provided with a superior finished surface corresponding to the abrasive used in spite of the unevenness of the preliminary finishing transversal-axis wet buffing.

Figure 7:
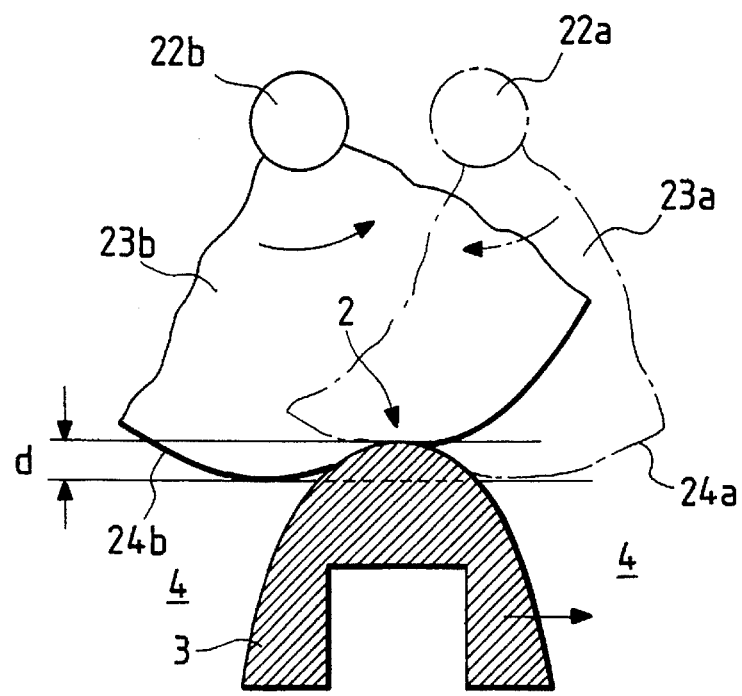
FIG. 7 is a diagram showing the contact state of a buff and a spoke portion in a step of transversal-axis wet buffing.

If the buffs 23a and 23b are set to be given predetermined flexibility d as shown in FIG. 7, it is possible to make the lower ends of the circumferential surfaces of the respective buffs 23a and 23b reach to the lower portions correspondingly to the flexibility d in response to the release of the flexibility d.

This means that, if the depths of the concave portions are almost not more than the size d, the buffs 23a and 23b will contact the inside of concave portions which exist in the circumferential direction of the design surface 2, so that wet buffing can be performed also in the concave portions by supplying an abrasive liquid.

The buffs 23a and 23b are arranged to contact the design surface 2 along circumferential side portions of the spoke portion 3 so that pressure can be applied uniformly to both sides of the spoke portion 3 while driving the vehicle wheel blank 1 in one direction by means of the rotary table 21.

Since working is performed while providing and releasing the flexibility d of these buffs 23a and 23b as has been described, the buffs 23a and 23b themselves generate heat. However, the lies of the buffs 23a and 23b can be prolonged because an abrasive liquid is directly sprayed to the flexible portions of the buffs 23a and 23b as mentioned above.

Longitudinal-axis wet buffing is performed on the design surface 2 after the step of preliminary finishing transversal-axis wet buffing has been completed. In order to avoid confusion in the following description, this step of longitudinal-axis wet buffing will be referred as a step of preliminary finishing longitudinal-axis wet buffing.

This step of preliminary finishing longitudinal-axis wet buffing is performed by the same means (with reference to FIGS. 3 and 4) as that used in the above-mentioned step of electrolysis composite-type longitudinal-axis wet buffing, but a description of the electrode 14, the DC power supply 17, etc. (FIG. 8) is not provided.

The step of preliminary finishing longitudinal-axis wet buffing will be described by using the same reference numerals for the same parts as those mentioned above.

That is, in this step of preliminary finishing longitudinal-axis wet buffing, a design surface 2 is polished by the lower end surface of a buff 13 attached to the lower end portion of a rotation shaft 12 hung down onto the design surface 2, but electrolysis working as mentioned above is not performed.

Also in this step of preliminary finishing longitudinal-axis wet buffing, a rotary table 11 is driven at a low speed in the same manner as that mentioned above, and the rotating direction of the rotary table 11 is reversed at desired time intervals (for example, 30 seconds) also in the same manner as that mentioned above.

The buff 13 is formed of an extremely soft material in comparison with a conventional buff, and in this embodiment, the buff 13 is a continuous bubble sponge material having a large expansion ratio also in the same manner as that mentioned above.

Also in the same manner as that mentioned above, while the urging force of the buff 13 against the design surface 2 is small, for example, not more than 1 kgf/cm$^2$, the lower end surface of the buff 13 maintains contact with the design surface 2 in spite of the presence of the uneven portions of the design surface 2 as shown in FIG. 4.

Also in the same manner, the rotation shaft 12 supporting the buff 13 in its lower end portion is to be driven, for example, at the rotation speed 300 rpm so that the rotation speed of the buff 13 is made extremely low, about 10 m/sec or less (for example, 4 m/sec). The rotation shaft 12 is held by an elevator 15, and when the rotating direction of the rotary table 11 is to be reversed the buff 13 is moved upward away from the design surface 2 by the elevator 15, and the rotating direction of the rotation shaft 12 is also reversed so as to be driven to rotate in the direction coincident with the rotating direction on the rotary table 11.

An abrasive liquid having the same components as mentioned above, and including alumina having a particle diameter of 10 μm, is supplied to the contact portion between the buff 13 and the design surface 2 through the shaft hole 12*a* of the rotation shaft 12 and an abrasive liquid nozzle 16, so that wet buffing is performed.

Preliminary finishing longitudinal-axis wet buffing is performed following the above-mentioned step of preliminary finishing transversal-axis wet buffing so that polishing traces caused by the step of preliminary finishing transversal-axis wet buffing are erased by polishing in a perpendicular direction in the preliminary finishing longitudinal-axis wet buffing step.

Further, in accordance with this step of preliminary finishing longitudinal-axis wet buffing, since the buff 13 is soft and rotated at a low rotation speed, the buff 13 follows the uneven portions of the design surface 2 to polish the design surface 2 in spite of the unevenness. It is therefore possible to effectively eliminate foreign matter under the buff 13 by the raising and lowering operation of the buff 13 when the rotating direction of the rotary table 11 is reversed, and a superior finished surface is thus obtained.

A step of mirror finishing transversal-axis wet buffing (corresponding to the first polishing step according to the present invention) is performed next (with reference to FIGS. 5 to 7) in order to provide a mirror finish.

Since this step of mirror finishing transversal-axis wet buffing is performed almost in the same manner as the step of preliminary finishing transversal-axis wet buffing except for the use of an abrasive liquid, a description of the same means and steps as those mentioned above is omitted, and only those terms relating to different points will be described.

The abrasive liquid used in the step of mirror finishing transversal-axis wet buffing in this embodiment is a solution including alumina of the particle diameter 1 μm, and a surface active agent is added thereto.

The step of mirror finishing transversal-axis wet buffing is performed after the step of preliminary finishing longitudinal-axis wet buffing in order to remove the polishing traces caused by the step of preliminary finishing longitudinal-axis wet buffing using comparatively higher forces and an abrasive with a particle diameter of 10 μm. Transversal-axis wet buffing is performed so that the polishing traces caused by the large transversal-axis forces and large grit abrasive are effectively erased by wet buffing with abrasive having a minute particle diameter and applied with a smaller force. It is therefore possible to obtain an extremely superior bright finished surface.

From the same reason as the above-mentioned step of preliminary finishing transversal-axis wet buffing, in this step of mirror finishing transversal-axis wet buffing, it is possible to make linear contact and to supply fresh abrasive. It is also possible to polish the inside of the design surface 2, and it is further possible to directly spray an abrasive liquid to portions in which the buffs 23*a* and 23*b* have flexibility, so that the buffs 23*a* and 23*b* are easily and effectively cooled.

A step of mirror finishing longitudinal-axis wet buffing (corresponding to a second polishing step according to the present invention) is performed next on the vehicle wheel blank 1 (with reference to FIGS. 3 and 4), so that the design surface 2 of the vehicle wheel blank 1 is finally finished into a mirror-finished surface.

Since this step of mirror finishing longitudinal-axis wet buffing is performed almost in the same manner as the above-mentioned step of preliminary finishing longitudinal-axis wet buffing except for the abrasive liquid, a description of the same means and steps as those mentioned above is omitted, and only terms relating to different points will be described.

The abrasive liquid used in the step of mirror finishing longitudinal-axis wet buffing in this embodiment is a solution including alumina having a particle diameter of 1 μm, which is the same as the abrasive liquid used in the above-mentioned step of mirror finishing transversal-axis wet buffing.

The step of mirror finishing longitudinal-axis wet buffing is performed after the step of mirror finishing transversal-axis wet buffing in order to remove minute polishing traces caused by the step of mirror finishing transversal-axis wet buffing. This is done by polishing in the direction intersecting the polishing traces and by use of the same abrasive liquid including abrasive of the same particle diameter.

In comparison with a conventional molded product, the finished design surface 2 obtained by the present invention has a mirror-finished state equivalent to a mirror-finished product finished by skilled worker's hand.

In accordance with this step of mirror finishing longitudinal-axis wet buffing, since the buff 13 is soft and rotated at a low rotation speed in the same manner as that in the step of preliminary finishing longitudinal-axis wet buffing, the buff 13 follows the uneven portions of the design surface 2 so well that the buff 13 polishes the design surface 2 in spite of the presence of the uneven portions, so it is advantageously possible to effectively eliminate foreign matter under the buff 13 by the rising and sinking operation of the buff 13 at the time that the rotary table 11 changes direction. An extremely superior finished surface is thereby obtained.

Figure 9:
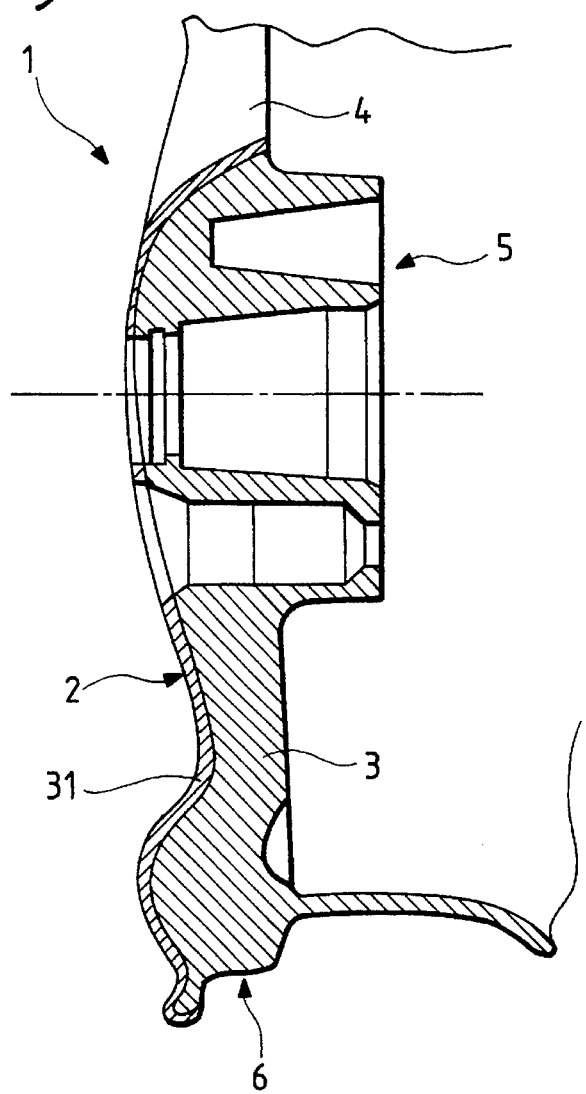
FIG. 9 is a cross-sectional view of a design surface on which a transparent coating is formed.
Figure 12:
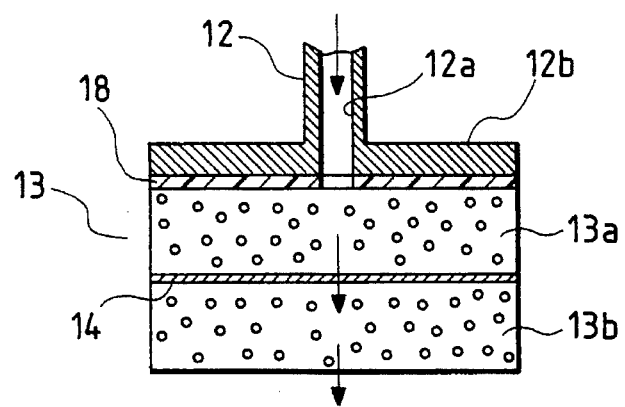
FIG. 12 is a cross sectional view of a buff.

A coating is then applied as follows onto the design surface 2 of the vehicle wheel blank 1 to form a transparent coating 31, as shown in FIG. 9.

In this embodiment, a coating composite used in the step of forming coating is an inorganic-organic composite paint of a silica-silane group and is composed mainly of inorganic material. The coating composite includes a dispersion liquid, acrylic resin and a surface active agent.

The dispersion liquid of this coating composite consists of colloid silica which is 20 to 60 percent by weight, and a partial hydrolysis condensation product of organo-alkoxy-silane which is 20 to 60 percent by weight, the percentage being relative to the total quantity of a solid component of the coating composite.

The acrylic resin of this coating composite consists of polymer or copolymer of unsaturated ethylenic monomer which is 5 to 40 percent by weight, and a solvent for which glycol derivative is indispensable and which is 150 to 550 percent by weight. This solvent is a low level aliphatic alcohol such as methanol including glycol derivative not less than 10 percent by weight. All percentages are relative to the total quantity of a solid component of the coating composite.

The surface active agent of the coating composite is a nonionic surface active agent.

A viscosity gain agent, a bubble erase agent, and a dyestuff or the like may be added to this coating composite as necessary.

The respective components are added in accordance with the above-specified ranges for the reasons noted below.

The colloid silica is 20 to 60 percent by weight. If the lower limit is exceeded, the hardness of the transparent coating 31 is reduced, whereas if the upper limit is exceeded, the collision-resistance factor is degraded.

The partial hydrolysis condensation product of organo-alkoxy-silane is 20 to 60 percent by weight. If the lower limit is exceeded, the contractibility of the transparent coating 31 would be degraded, whereas if the upper limit is exceeded, the collision-resistance factor is degraded.

The polymer or copolymer of unsaturated ethylenic monomer is 5 to 40 percent by weight. If the lower limit is exceeded, it would be difficult to form the coating layer over 20 μm and cracks would be likely to be formed due to thermal contractions or the like. In this case, the collision-resistance factor and anti-corrosion factor would be degraded. If the upper limit is exceeded, the hardness of the coating 31 would be reduced to deteriorate the anti-frictional surface damage and the anti-contamination property.

The glycol derivative is contained in the low level aliphatic alcohol over 10 percent by weight. The reason for this is to enhance the aging stability of the coating, and it is also possible to maintain the appearance of the coating 31 and to make it easy to product it.

The nonionic surface activating agents are used so that the aging stability of the coating is maintained.

The transparent coating 31 is formed on the design surface 2 by a conventional method such as spraying or the like. In this case, the coating composite adheres to the design surface 2 so well that primary treatment is not necessary if the design surface 2 is kept clean.

After the coating composite is applied to the design surface 2, the coating composite is heated to 100 to 200 in for about 10 to 20 minutes by a furnace to be dried and hardened, thereby obtaining a transparent coating 31.

The transparent coating 31 thus formed on the design surface 2 has not only superior transparency and adhesion to the design surface 2, but also high impact resistance and crack resistance. Therefore, even in the case where the transparent coating 31 on the design surface 2 is formed thinner than a conventional coating, for example, about 10 μm, the transparent coating 31 protects the design surface 2 from being damaged.

The thickness of the transparent coating 31 can be made so thin that the transparency of the transparent coating 31 becomes superior to conventional ones, and there is no fear that the finishing unevenness of the design surface 2 will show since design surface 2 is finished into an extremely superior mirror-finished surface as has been described above.

Further, since this transparent coating 31 has superior corrosion resistance and adhesion, corrosion is hardly generated in the design surface 2, and its initial brightness can be maintained for a long time. Further, the transparent coating 31 has superior stain-proof qualities, and it is to easy to eliminate stains adhering to the surface of the transparent coating 31, so that brightness is easily maintained.

In the vehicle wheel blank 1 according to this embodiment, the design surface 2 is finished to an extremely superior finished surface, and the transparent coating 31 formed on the design surface 2 has extremely superior transparency, so that the superior brightness of the design surface 2 can be easily observed and recognized through the transparent coating 31. The appearance of the vehicle wheel blank 1 is thus superior.

The transparent coating 31 may be formed with either organic paint or inorganic paint. In the latter case, it is advantageous to prevent the generation of so-called string rust on an automotive aluminum wheel.

As has been described, according to this embodiment, an aluminum-alloy cast product is used as a subject to be worked, and both the steps of preliminary and mirror finishing are performed thereon by wet buffing, so that minute pores or pin-holes opening to the surface of the cast product are closed and made small with the contact friction achieved by buffing, and so that it is possible to reduce defects on the finished surface or the cast product to obtain a superior finished surface.

The present invention can be applied to a vehicle wheel of a forged product as well as a cast product, and the material of the subject to be worked is not limited to an aluminum alloy, but any other metal material such as a copper alloy may be used so long as the metal material may be mirror-finished.

As has been described, according to the present invention, a soft buff is used so that the surface of a molded product can be polished despite the unevenness of the surface.

Further, since such buffing is a wet buffing with an abrasive liquid, the rotation speed of the buff is lower than that in dry buffing with no abrasive liquid, and the buff is therefore effective on uneven surfaces.

Further, since the buffing device has a transverse rotation axis and thus contacts the circumferential surface of the molded product, the contact area between the buff and the molded product is linear and therefore small, so it is possible to supply fresh abrasive liquid to the contact area, and it is also possible to exclude foreign matter such as buffing dusts thereby making it possible to obtain a superior finished surface without doing so by hand.

Therefore, since the finishing process is much improved, the conventional problems of poor finishing but improved transparency are solved, and the appearance of the vehicle wheel is greatly enhanced.

Further, since a buffing device having a transversal rotation axis and a soft buff is used, the aforementioned contact area is small, so that it is possible to supply an abrasive liquid to the vicinity of the contact area. Accordingly, as an additional advantage, it is possible to affectively cool heat generation of the buff due to elastic transformation in the contact area to thereby prolong the life of the soft buff.

Another embodiment of the invention will be described with reference to FIGS. 10 and 11. This embodiment is a wet buffing method for polishing the surface of a workpiece so that the surface of the workpiece contacts a buff which in rotated and which supplies an abrasive liquid to the surface of the workpiece.

In this type of wet buffing method, the abrasive is supplied to the buff via the abrasive liquid which contains the abrasive.

Since the polishing operation is performed in a contact area between the buff and the workpiece, the abrasive liquid is supplied so as to reach the central part of the contact area.

The abrasive thus supplied to the contact area is worn through the polishing action, and must be exhausted from the contact area in order to improve the efficiency of the polishing action. If a great deal of the worn abrasive in left in the contact area, metal powder produced by the polishing action may attach to the worn abrasive, possibly causing minute defects in the surface of the workpiece or unevenness of the finishing.

In the conventional technique using this type of wet buffing method, in order to prevent deterioration of the surface of the workpiece, the buff is replaced with a new one at predetermined time intervals.

The buff replacing work is troublesome. In addition, the attainment of quality finished surface requires frequent replacement work. This results in reducing the wet buffing efficiency.

This embodiment, which is presented for solving the above-mentioned problems, realizes a high efficiency operation of the wet buffing finishing as well as high quality finishing of the surface of the workpiece, and with infrequent buff replacement.

To achieve the above objects, a wet buffing method is employed for polishing the surface of a workpiece such that the surface is brought into contact with the buff mounted to a rotation shaft while an abrasive liquid is supplied to the surface of the workpiece. During the step of polishing the surface of the workpiece with the buff, the buff is moved so as to increase a gap between the buff and the workpiece surface, and then is moved so as to decrease the gap therebetween until the buff comes in contact with the workpiece surface, and during the polishing step, the supply of the abrasive liquid to the surface of the workpiece is continued.

In the wet buffing method of the invention, the abrasive liquid is supplied to the gap between the buff and the surface of the workpiece. As the buff moves toward the surface of the workpiece, the urging force of the buff against the workpiece is reduced.

The worn abrasive, metal powder, and the like, which have thus far been held between the buff and the workpiece, are released and exhausted by the abrasive liquid.

The residual materials, such as worn abrasive, in the gap between the buff and the surface of the workpiece are expelled, so that the likelihood of minute defects on the surface of the workpiece and uneven finishing are minimal.

Accordingly, troublesome buff replacement work is infrequently required. The efficient wet buffing can be carried out even where high quality surface polishing is required.

A preferred embodiment of the present invention will be described next with reference to FIGS. 10 and 11. In this embodiment, the broad concept of the present invention is applied to vehicle wheels which are cast products of an aluminum alloy. In this specification, the design surface means a surface which faces outward from a vehicle body and forms a part of the overall appearance of a vehicle when the wheel is mounted on the vehicle. Like reference numerals are used for designating like or equivalent portions throughout the drawings of FIGS. 3 to 9.

First, a vehicle wheel blank 1 as a workpiece is a cast product obtained by pouring a molten aluminum (for example, AC4CH) alloy into a mold having a predetermined shape.

The vehicle wheel blank 1 thus obtained is taken out of the mold and machined so as to be formed into a predetermined accurate shape as the vehicle wheel blank 1.

In the vehicle wheel blank 1, a number of uneven portions are formed by spoke portions 3, through holes 4, hub portions 5, rim portions 6 and so on from a design perspective (with reference to rigs. 3 and 4).

The design surface 2 (corresponding to the surface of the invention) of the vehicle wheel blank 1 is subjected to the steps of a rough finishing and a half finishing. Then, the wet buffing method to be given hereinafter is performed on the design surface 2 to be finished into a bright finished surface at last.

The wet buffing method of the present embodiment will be described with reference to FIGS. 3 and 4.

The vehicle wheel blank 1 is fixed on a rotary table 11 so that its center is coincident with the rotation center O of the rotary table 11 and the design surface 2 is fixed in an upwardly facing and horizontal attitude. Next, the design surface 2 is polished by the lower end surface 13a of a buff 13 attached to the lower end portion of a rotation shaft 12.

The rotary table 11 is driven to rotate at a low speed at the time of working and the portion to be worked by the buff 13 is displaced circumferentially sequentially. In this embodiment, the rotating direction of the rotary table 11 is reversed at desired time intervals (for example, 30 seconds). The buff 13 is formed of an extremely soft material in comparison with a conventional buff, for example, in this embodiment, a continuous bubble sponge material having a large expansion ratio (for example, 3 to 5). The buff 13 is not limited to a sponge material, but may be any other material so long as it is as soft as the sponge material.

The buff 13 can therefore maintain contact with the design surface 2 in spite of the presence of the uneven portions of the design surface 2 as shown in FIG. 4.

The urging force of the buff 13 against the design surface 2 is small, for example, not larger than 1 kg/cm$^2$.

The rotation shaft 12 supporting the buff 13 in its lower end portion can be moved vertically by an elevator 15 which includes an oil pressure cylinder and other components. The rotation shaft 12 is driven, for example, at a rotation speed of 300 rpm so that the rotation speed of the buff 13 is made to be extremely low (not higher that 10 m/sec), for example, 4 m/sec in this embodiment.

The above-mentioned soft material buff is easily deformed so as to follow the uneven portions of the design surface 2, while maintaining contact with the uneven portions.

The rotation shaft 12 is driven to rotate in a direction coincident with the rotating direction of the rotary table 11, and if the rotating direction of the rotary table 11 is reversed to the opposite direction, the rotation shaft 12 is pulled up by the elevator 15 so that the buff 13 moves upward away from the design surface 2, and the rotation shaft 12 is driven to rotate in the opposite direction at the same time.

Accordingly, even if the rotating direction of the rotary table 11 is reversed, the respective rotating directions of the rotary table 11 and the buff 13 are always coincident.

A shaft hole 12a is formed in the rotation shaft 12, so that an abrasive liquid containing abrasive added thereto is supplied to the center portion of the buff 13 through this shaft hole 12a.

This abrasive liquid is an aqueous solution containing alumina 10 μm in particle diameter as the abrasive, and also containing a surface active agent added thereto.

An abrasive liquid nozzle 16 is provided for supplying the same abrasive liquid as mentioned above to a contact portion or area between the buff 13 and the design surface 2 as shown by a phantom line in FIG. 3.

The abrasive liquid in supplied at approximately 100 cc/min from the shaft hole 12a of the rotation shaft 12 and the abrasive liquid nozzle 16.

The supply of the abrasive liquid from this abrasive liquid nozzle 16 is continued even when the rotating direction of the rotary table 11 is reversed.

In this embodiment, the rotation of the rotary table 11, the rotation of the buff 13, the movement of the rotation shaft 12, and the supply of the abrasive liquid are timed as illustrated in the timing chart of FIG. 10.

In FIG. 10, the abscissa represents a time axis. At time t0 the rotary table 11 is rotating clockwise (CW). The CW rotation of the rotary table 11 stops at time t1. During a time period from time t0 to t1, the rotation shaft 12 and the buff 13 are urged against the design surface 2 by a predetermined urging force in the direction indicated by a solid line in FIG. 4 (in FIG. 10, it is denoted as "Contact"). The buff 13 is being rotated clockwise at a predetermined speed by the rotation shaft 12. During this period, the abrasive liquid is supplied to the contact area of the lower end surface of the buff 13 and the design surface 2 by way of the shaft hole 12a of the rotation shaft 12 and the abrasive liquid nozzle 16.

During the period from time t0 to t1, the design surface is polished by the abrasive contained in the abrasive liquid, in the contact area of the buff 13 and the design surface 2.

At time t1, the direction of the rotation of the rotary table 11 and the buff 13 are reversed so that the table and buff are both stopped momentarily in rotation. The elevator 15 lifts the rotation shaft 12. The lower end surface of the buff 13 is moved away from the design surface 2 (to reach the ascending position as indicated by the phantom line in FIG. 11 and denoted as "Separate" in FIG. 10). Also in this state, the supply of the abrasive liquid is carried out as in the previous case.

The abrasive liquid is thus supplied to the portion of the design surface where the buff 13 was in contact with the design surface 2, but with the buff 13 now separated from the design surface 2. Accordingly, worn abrasive, metal powder, and the like, which have been held in the contact area till time t1, are washed out by the abrasive liquid.

This state is continued for a short time from time t1 to t2, for example, about 5 seconds.

At time t2 the counterclockwise (CCW) turn of the rotary table 11 starts. The elevator 15 descends. With the descending of the elevator 15, the rotation shaft 12 starts to turn counterclockwise in a state that, as already stated, at the descending position it urges the buff 13, by a predetermined urging force, against the design surface 2. Since the abrasive liquid is supplied as in the previous case, the design surface is polished in the contact area also during the period of time from time t2 to t3, as in the case of the CW turn.

Since the worn abrasive, metal powder and the like, which were caused during the time period from time t1 to t2, have been exhausted, fresh abrasive is readily dispersed over the contact area, ensuring a good polishing operation.

The time period from time t2 to t3 is about 30 seconds, for example. The CCW turn of the rotary table 11 and the like also continue for substantially equal time periods.

At time t3, the rotating direction of the rotary table 11 and the buff 13 is reversed to the CW rotating direction, and are stopped in their rotation.

The lower end surface of the buff 13 and the design surface 2 are separated from each other by the elevator 15 and then by the rotation shaft 12, and the supply of the abrasive liquid continues, as in the operation for the time period from t1 to t2.

The worn abrasive, metal powder and the like, which have accumulated in the contact region until time t3, are washed away by the abrasive liquid, and from time t4 the rotary table 11 and the buff 13 start to turn in the CW direction. The subsequent operation resembling that from time t1 to t2 progresses.

The rotation, stop, and reverse of the rotary table 11 and the buff 13 are repeated at proper time intervals, to polish the design surface 2 into a bright finished surface.

In this embodiment, with the reversal of the rotating direction of the rotary table 11 and the buff 13, the buff 13 is lifted from the design surface 2. In this separated state, the abrasive liquid is supplied to the portion on the design surface 2 where the buff 13 was in contact which the design surface 2. Accordingly, the foreign materials, such as the worn abrasive, which have accumulated in the contact region during the polishing operation, are surely removed.

The life of the buff 13 is relatively long. There is no need to frequently replace the buff 13 with a new one. The polishing operation can be efficiently performed to obtain a high quality finished surface.

In the above-mentioned embodiment, the foreign materials, such as worn abrasive, are removed utilizing the reversal of the turn of the rotary table 11 and the like. The same purpose can be attained by an alternative as shown in FIG. 11.

Figure 11:
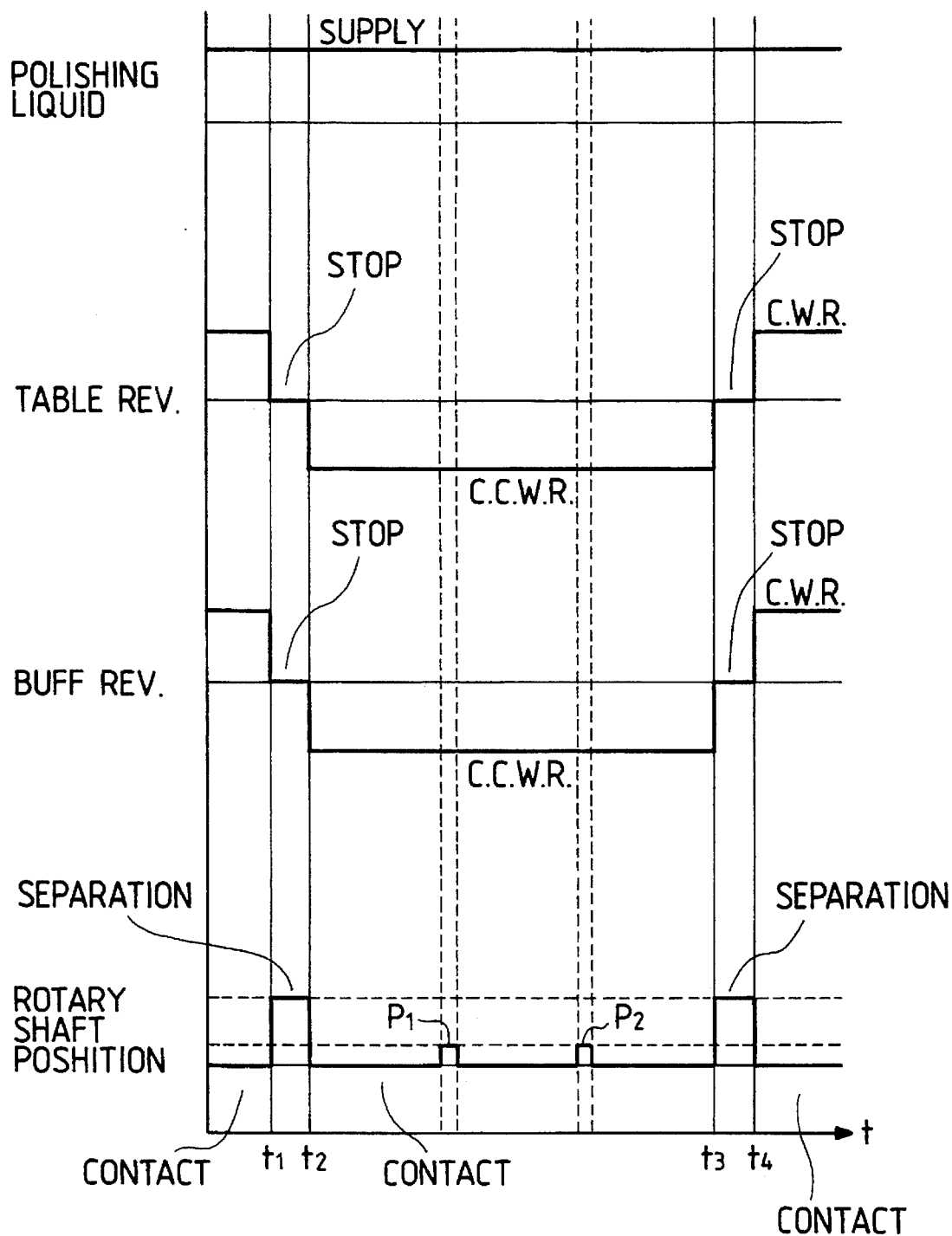
FIG. 11 is a timing chart showing a modification of the method in FIG. 10.

The timing chart shown in FIG. 11 is equivalent to that of FIG. 10, which additionally includes chances or opportunities P1 and P2 to remove worn abrasive and the like. Description will be given hereunder on only the abrasive removal chances.

The operation described in the timing chart of FIG. 11 for the wet buffing method has an advantage over the operation described in the timing chart already described in that the worn-abrasive removal chances are present between time points t1 and t2, and between time points t3 and t4, and in that the range of the vertical movement of the rotation shaft 12 is smaller, and the time for the vertical movement is shorter.

With provision of the chances P1 and P2, as seen from FIG. 11, the rotation shaft 12 is slightly lifted for a short time during the CCW turn of the rotary table 11 and the buff 13, to thereby move the buff 13 away from the design surface 2 to such an extent that the buff 13 is not detached from the design surface 2, i.e., to weaken the urging force of the buff against the design surface.

As a result, the force to catch and hold the worn abrasive and the like between the buff 13 and the design surface 2 is lessened, thereby slightly promoting the use of the abrasive liquid to wash away the worn abrasive from the contact area and to supply fresh abrasive thereto. The life of the buff 13 is relatively long. With infrequent replacement of the buff 13, the polishing operation can be efficiently performed to obtain a high quality finished surface.

It is preferable that the chances P1 and P2 to remove the worn abrasive and to supply new abrasive recur at short time intervals, e.g., about 5 seconds, so as to allow the successive vertical movement of the buff 13 during the polishing operation. Such short time periods help maintain the abrasive, which acts to polish the design surface between the buff 13 and the design surface 2, in good condition.

If the buff 13 in moved so as to disengage from the design surface 2, fresh abrasive efficiently replaces the old abrasive present between the buff 13 and the design surface 2, ensuring good polishing work by the abrasive. Accordingly, an excellent polished surface can be obtained in a relatively short time.

The above-mentioned embodiment employs the vertical shaft of the rotation shaft 12 for rotating the buff, but may employ a horizontal shaft, if required.

As described above, the abrasive liquid is supplied to the portion between the buff and the workpiece in a state that the urging force of the buff against the workpiece is reduced by the vertical movement of the buff. Under the reduced urging force, the force of catching and holding the worn abrasive, metal powder and the like between the buff and the workpiece is weakened, thereby promoting the removal of the worn abrasive. As a result, a small amount of worn abrasive and the like is left between the buff and the workpiece, thereby minimizing the minute defects on the surface of the workpiece and the unevenness of the finishing.

With infrequent replacement of the buff 13, the polishing operation can be efficiently performed to obtain a high quality finished surface.

Still another embodiment of the invention will be described with reference to FIGS. 12 through 15. This embodiment is directed to an electrolysis composite-type buffing method for simultaneously performing an electrolysis and buffing on the surface of a workpiece.

There is a conventional electrolysis buffing method for simultaneously performing electrolysis and buffing on the surface of a workpiece, in order to effectively finish the surface thereof to obtain a good finished surface (as disclosed in Japanese Patent Publication No. Sho. 60-48289).

In the conventional electrolysis composite-type buffing, a passive state oxide film is formed on the surface of a workpiece by the electrolysis action, and the irregular surface of the oxide film is smoothed by the buffing. Accordingly, the electrolysis composite-type buffing can efficiently finish the surface of the workpiece to achieve a high quality finish.

Also in the electrolysis composite-type buffing, presence of abrasive in the contact area between the buff and the surface of the workpiece is essential to remove the irregularity on the workpiece surface (or to work the workpiece). The abrasive is worn through the working of the workpiece.

A buff with abrasive bonded thereto or which is coated with abrasive is used in the electrolysis composite-type buffing. The buff effectively works the workpiece in the initial stage of using the buff, but the working efficiency deteriorates after it is used to a certain extent. To avoid this, the buffer is replaced with a new one.

Where the electrolysis composite-type buffing is used, the electrolysis working is operable continuously for a long time, but the buffing is interrupted repeatedly because the abrasive must be replaced. To replace the abrasive, the working must be stopped. Accordingly, the working efficiency of electrolysis composite-type buffing is not good.

For the above noted reasons, the present invention provides an electrolysis composite-type buffing method in which an electrolysis composite-type buffing is continuously operable for long periods of time, thereby improving the efficiency of the electrolysis composite-type buffing.

To achieve the above object, there is provided an electrolysis composite-type buffing method which employs a buff with an electrode fastened to one end of the rotating shaft. The buff is set on the surface of a workpiece fixed to a work table, and for the electrolysis working, an electrolyte is supplied to the portion between the electrode and the workpiece and electrolysis current is fed thereto. For the buffing, the buffer is rotated by the rotation shaft and abrasive is added to the electrolyte supplied.

In the above described electrolysis composite-type buffing method, a buff with an electrode is provided, electrolyte is supplied to the portion between the electrode and the workpiece, and abrasive is added to the electrolyte supplied between the electrode and the workpiece. Accordingly, the abrasive used for the buffing is continuously supplied to the contact area between the buff and the surface of the workpiece.

With the supply of the electrolyte, the abrasive is continuously refreshed, so that the interruption of the buffing occurs only infrequently.

Accordingly, in the electrolysis composite-type buffing method, the buffing can be continued for a long time using continuously supplied fresh abrasive. A good finished face can be obtained in a continuous manner, resulting in efficient operation of the electrolysis composite-type buffing.

The preferred embodiment of the present invention will be described below with reference to FIGS. 10 and 11. In this embodiment, the technical idea of the present invention is applied to vehicle wheels which are cast products of an aluminum alloy. In this specification, the design surface means a surface which faces outward from a vehicle body and forms a part of the overall appearance of a vehicle.

A vehicle wheel blank 1 or workpiece is a cast product obtained by pouring a molten aluminum (for example, AC4CH) alloy into a mold having a predetermined shape.

The vehicle wheel blank 1 thus obtained is taken out of the mold and machined so as to be formed into a predetermined shape.

In the vehicle wheel blank 1, a number of uneven portions are formed by spoke portions 3, through holes 4, hub portions 5, rim portions 6 and so on according to the design (with reference to FIGS. 3 and 4).

The design surface 2 (corresponding to the surface of the invention) of the vehicle wheel blank 1 is subjected to the steps of a rough filing and a half finishing. Then, the wet buffing method described hereinafter is performed on the design surface 2 to achieve a bright finished surface.

The electrolysis composite-type buffing method of the present embodiment will be described next with reference to FIGS. 3 and 4.

In this electrolysis composite-type buffing method, the vehicle wheel blank 1 is fixed on a rotary table 11 (corresponding to "work table" in this specification) so that its center is made coincident with the rotation center O of the rotary table 11, and so the design surface 2 faces upwardly and extends horizontally. Then, the design surface 2 is polished by the lower end surface of a buff 13 attached to an end plate 12b of the lower end portion of a rotation shaft 12.

The rotary table 11 rotates at a low speed at the time of working. The portion of the vehicle wheel blank 1 that is to be worked by the buff 13 is displaced circumferentially and sequentially. In this embodiment, the rotating direction of the rotary table 11 is reversed at desired time intervals (for example, 30 seconds). The buff 13 is formed substantially of a continuous bubble sponge material. An electrode 14 lies transversely along the center line of the cross section of the buff and in parallel with the end plate 12b (with reference to FIG. 12).

The sponge material constituting the buff 13 has a large expansion ratio (for example, 3 to 5), and is an extremely soft material in comparison with a conventional buff. The buff 13 is not limited to a sponge material, but may be any other material so long as the buff 13 is as soft as the sponge material.

The buff 13 in this embodiment is formed of a substrate part 13a located on upper side of the electrode 14 and a tool part 13b on the lower side of the electrode 14. The tool part 13b functions as a polishing part of the buff, and the substrate part 13a supports the electrode 14 and the tool part 13b, both being located on the lower side of the substrate part.

In this embodiment, the substrate part 13a and the tool part 13b are both formed of the same kind of materials, but they may be formed of different kinds of materials.

As described above, the substrate part 13a and the tool part 13b of the buff 13 are formed of extremely soft material.

Accordingly, the buff 13 is flexible, and the lower end surface of the buff 13 maintains contact with the design surface 2 in spite of the presence of the uneven portions on design surface 2.

The electrode 14 of the buff 13 is a mesh having the form of a flexible sheet-like member, and has the same outer dimensions as the buff 13.

Use of the substrate part 13a made of sponge material on the electrode 14 provides unique and beneficial effects in the electrolysis composite-type buffing method as will be apparent from the following description of the buffing method of the embodiment.

The buff 13 thus constructed is mounted on an insulating plate 18, which is also mounted on the lower side of the end plate 12b. A DC power supply 17 is inserted between the electrode 14 and the vehicle wheel blank 1. The electrode 14 is connected to the positive polarity or the DC power supply 17, and the design surface 2 of the vehicle wheel blank 1 is connected to the negative polarity.

The rotation shaft 12 supporting the buff 13 in its lower end portion is held by an elevator 15 constituted by an oil pressure cylinder and so on. The urging force of the buff 13 against the design surface 2 is small, for example, not larger than 1 kg/cm$^2$.

The rotation shaft 12 is driven, for example, at a rotation speed of 300 rpm so that the rotation speed of the buff 13 is extremely low, i.e., not higher than 10 m/sec. In this embodiment, for example, the speed is 4 m/sec.

The tool part 13b of the buff can be deformed easily to follow the uneven portions of the design surface 2 while maintaining contact with the uneven portions on the design surface 2.

The rotation shaft 12 is driven to rotate in the direction which is coincident with the rotating direction of the rotary table 11, and if the rotating direction of the rotary table 11 is reversed to the opposite direction, the rotation shaft 12 is pulled up by the elevator 15 so that the buff 13 moves upward away from the design surface 2, and the rotation shaft 12 is driven to rotate in the opposite direction at the same time.

Accordingly, even if the rotating direction of the rotary table 11 is reversed, the respective rotating directions of the rotary table 11 and the buff 13 are always coincident.

A shaft hole 12a is formed in the rotation shaft 12. An electrolyte is supplied to the lower end surface of the buff 13, through the shaft hole 12a, the substrate part 13a and the tool part 13b (see the arrows in FIG. 12).

An electrolyte nozzle 16 for supplying the electrolyte to a contact portion or area between the buff 13 and the design surface 2 is provided as indicated by a phantom line in FIG. 3.

The electrolyte supplied from the shaft hole 12a and the electrolyte nozzle 16 penetrates the sponge material of the tool part 13b between the electrode 14 and the design surface 2 to form an electrolysis circuit including the DC power supply 17. With the current flowing throughout the formed electrolysis circuit, an electrolytic action is performed on the surface of the design surface 2.

The electrolyte in this embodiment is a surface-active contained solution including sodium nitrate for the electrolytic action.

Since the electrolyte is supplied to the contact area between the buff 13 and the design surface 2 as mentioned above, abrasive for the buff 13 is also added to the electrolyte.

The abrasive contained in the electrolyte is alumina having a particle diameter of 10 μm. The electrolyte is continuously supplied to the contact area between the buff 13 and the design surface 2, so that the electrolytic action and the supply of fresh abrasive can be performed simultaneously.

The electrolyte of about 100 cc/min or more, for example, is supplied through the shaft hole 12a of the rotation shaft 12 and the electrolyte nozzle 16.

In the electrolysis composite-type buffing method, the electrolysis working and the buffing with abrasive are concurrently performed in a composite manner, that is, electrolysis composite-type buffing is continuously performed. Accordingly, the working efficiency is superior to that in ordinary buffing. Further, buff replacement stoppages are infrequent, and the efficiency of the working is therefore greatly improved.

The supply of the electrolyte from the electrolyte nozzle 16 is continued also when the rotary table 11 is reversed in direction. At the time of the reverse turn of the rotary table 11 and of the ascending of the buff 13, the electrolyte in sprayed toward the portion of the design surface under the buff 13. The sprayed electrolyte washes away buffing dusts and other foreign materials, which have thus far been left in the contact portion between the buff 13 and the design surface 2.

In a case where the workpiece is made of an aluminum alloy, silicon crystalline appears on the surface of the workpiece as the result of the electrolysis working. In this embodiment, the silicon crystalline are removed by the buffing since the wet buffing is performed concurrently with the electrolysis working.

The provision of the sponge substrate part 13a on the lower side of the electrode 14 brings about the following beneficial effects.

Where the electrolysis working and the buffing are combined as in the embodiment, the distance between the electrode 14 and the design surface 2 is an important control factor greatly influencing the working efficiency and the finished surface in the electrolysis working.

In the buffing, selection of a proper urging force of the lower side of the buff 13 against the design surface 2 is also an important factor in obtaining a good finished surface. In the molded product of which the surface to be finished is uneven, such as the vehicle wheel blank 1, the lower side of the buff 13 must be kept in contact with the surface in spite of the uneven surface. To cope with this, the buff 13 is made of a soft material. Accordingly, the height of the electrode 14 as measured from the design surface 2 varies greatly.

The requirement for the buff material in the buffing and the requirement for the height of the electrode 14 in the electrolysis working are contradictive. The contradiction arises from the intrinsic nature of the electrolysis composite-type buffing method.

The sponge substrate part 13a provided on the electrode 14 in the buff 13 as a compromise between the requirements for electrolysis working and buffing, and it forms a good finished surface.

The functions of the substrate part 13a will be described in detail with reference to FIGS. 13A and 13B.

Figure 13A:
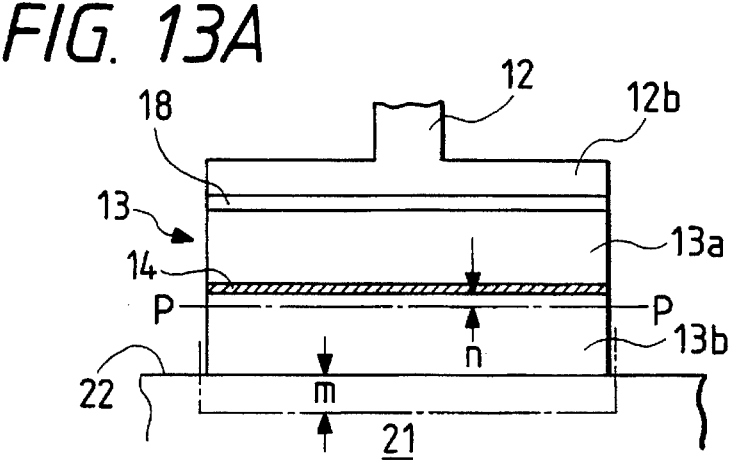
FIGS. 13A and 13B illustrate the buffing operations performed by the buff of FIG. 12.

FIG. 13A is an explanatory diagram showing how an electrolysis composite-type buffing is performed on the surface 22 of a planar workpiece 21.

Since a predetermined urging force is made to act on the buff 13, the lower side of the buff 13 is raised a distance m from a free state position P as indicated by a phantom line. With the raising motion, the gap between the surface 22 of the workpiece 21 and the end plate 12b in decreased.

Accordingly, if the electrode 14 is fastened to the end plate 12b, the gap between the surface 22 of the workpiece 21 and the end plate 12b is varied by the distance m. This results in a great variation of the electrolysis working condition.

In the buff 13, the electrode 14 is provided so that the substrate part 13a of sponge material is interposed between the electrode and the end plate of the rotation shaft. Accordingly, the electrode is pushed up a distance n from the free state position P of the electrode, and the displacement of the electrode 14 from the surface 22 of the workpiece 21 is reduced by a distance m–n.

The current flowing from the electrode 14 to the surface 22 is concentrated at the portion where the distance between them is the shortest. However, the current concentration is less since the displacement of the electrode 14 is reduced as stated above. Accordingly, the electrolysis working is performed over the surface with a satisfactory uniformity, and to obtain a uniformly finished surface.

With the above-mentioned construction of the buff 13, properly selecting the urging force of the buff 13 reduces a frequency of the adjustment of the electrolysis conditions, thus providing a good finished surface.

When the electrolysis composite-type buffing is applied to such a planar surface 22, the electrode 14 may be made of material of a high rigidity, not the flexible material.

Figure 13B:
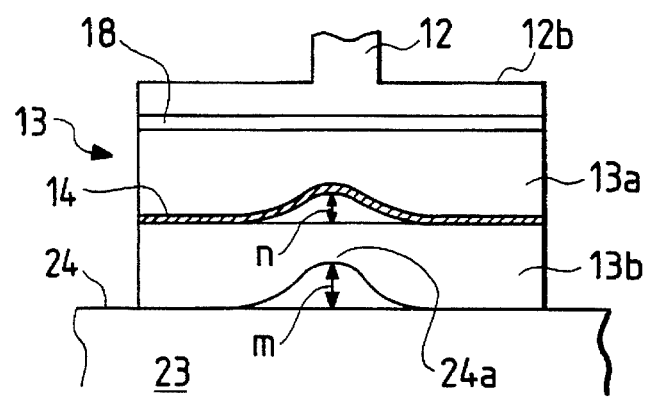

FIG. 13B is an explanatory diagram showing how an electrolysis composite-type buffing is performed on the uneven surface 24 of a planar workpiece 23 such as a molded product. In the electrolysis composite-type buffing, the current flowing from the electrode 14 to the surface 24 concentrates at the portion where the distance between them is the shortest. In the construction as shown, if the electrode 14 is constructed with a mesh as a flexible sheet-like member, the useful effects as mentioned above can be attained for the local area portion of the surface.

When the buff 13 is positioned on the upwardly curved portion 24a of the surface 24 of the workpiece 23, the lower side of the buff 13 is pushed upward distance m corresponding to the height of the upwardly curved portion 24a. With this, the electrode 14 is locally raised a distance n in the portion corresponding to the upwardly curved portion 24a.

In this case, if the electrode 14 is rigid, the distance between the electrode 14 and the upwardly curved portion 24a of the surface 24 of the workpiece 23 is a distance m smaller than that between the electrode 14 and the other portions of the workpiece 23. The current from the electrode 14 concentrates at the upwardly curved portion 24a, so that the upwardly curved portion 24a is excessively electrolyzed. The current density in the remaining portion of the surface 24 is low, so that the electrolytic action there is weak or unsatisfactory.

In the buff 13, the electrode 14 is also locally displaced distance n in the upward direction. In the portion of the electrode corresponding to the upwardly curved portion 24a, the distance or gap width between the electrode 14 and the surface 24 of the workpiece 23 is reduced only distance m–n. The difference in distances between the electrode 14 and the working surface is smaller than in the previous case, so the surface of the workpiece is relatively uniformly electrolyzed.

Accordingly, use of the buff 13 of this embodiment diminishes the nonuniform electrolysis working, thereby providing a good finished surface.

The substrate part 13a made of the sponge material may be made of any other suitable material and may have any other suitable structure.

Figure 14:
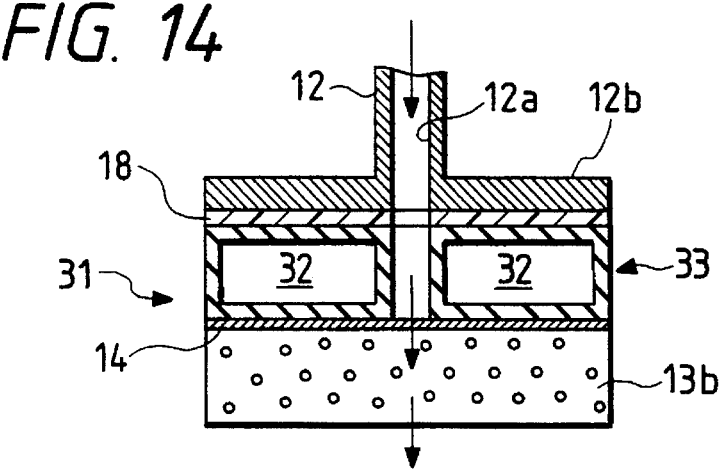
FIG. 14 is a cross sectional view of a modification of the buff of FIG. 12.

A buff 31 structured as shown in FIG. 14 functions like the above-mentioned buff. In the description of this buff, like reference numerals in the above-mentioned embodiment for the buff 13 are used for designating like or equivalent portions of the buff 31. Description will be made only with respect to the differences between the buff 31 and the buff 13.

In the buff 31, the substrate part 13a of the buff 13 is substituted by a ring-like cushion member 33 containing an air chamber 32 shaped like a ring. An electrode 14, formed of a mesh as a flexible sheet member, lies underneath the ring-like cushion member 33. The tool part 13b of the buff lies on the lower side of the electrode 14.

Also in the buff 31, the ring-like cushion member 33, like the buff 13, is entirely or locally deformed under the urging force or by the unevenness of the surface, because the cushion member 33 contains the air chamber 32. The deformation diminishes the variation of the gap width between the electrode 14 and the workpiece surface. Accordingly, a good finished surface can be secured for the same reasons as mentioned above.

Figure 15:
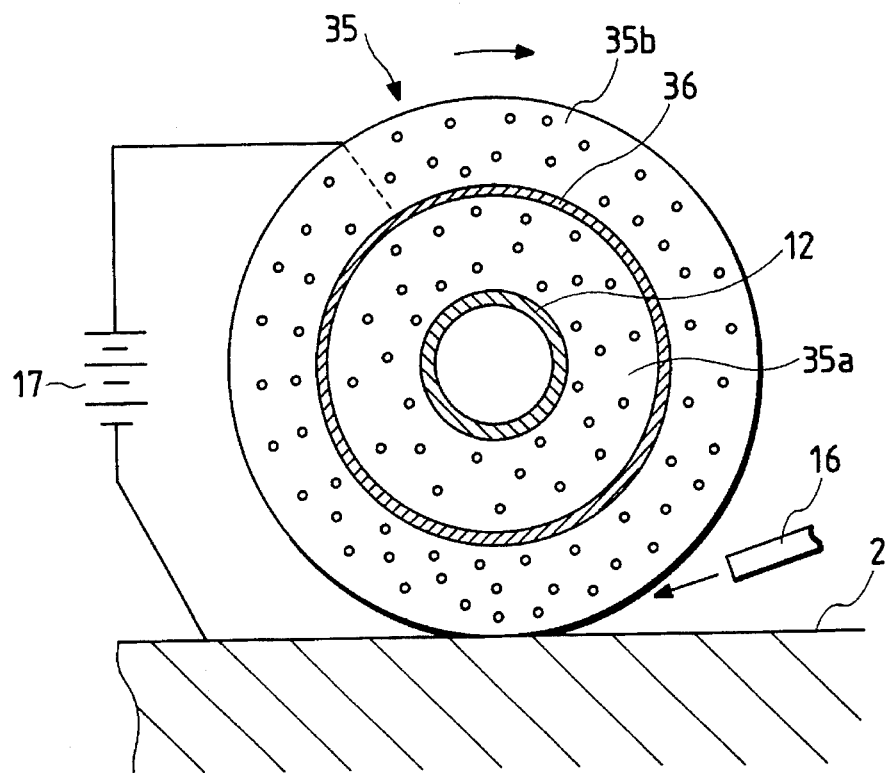
FIG. 15 is a cross sectional view of another embodiment of the invention.

While in the above-mentioned embodiments, the buff is of the vertical shaft type in which the rotation shaft 12 is vertically disposed, it is evident that the buff can be of the horizontal shaft type in which the rotation shaft 12 is horizontally disposed as shown in FIG. 15.

The embodiment of the invention using the horizontal shaft type buff shown in FIG. 15 will be described next.

In FIG. 15, a buff 35 is of the horizontal shaft type in which the rotation shaft 12 is disposed substantially parallel to the design surface 2. The buff 35 buffs the design surface 2 in a state that it is in contact with the design surface 2. The electrolyte is supplied through the electrolyte nozzle 16 as in the above-mentioned embodiments.

The buff 35 of a three-layer structure is formed of a substrate part 35a made of sponge material layered around the rotation shaft 12, a tubular electrode 36 layered around the substrate part 35a and coaxial with the rotation shaft 12, and a tool part 35b made of the sponge material, which is layered around the electrode 36.

A DC power supply 17 is inserted between the electrode 36 of the buff 35 and the design surface 2, thereby forming an electrolysis circuit.

The embodiment using the horizontal shaft type buff functions the same as the embodiments using the vertical shaft type buff, and has similar useful effects.

When the horizontal shaft type buff is used, the tool part 35b linearly contacts with the design surface 2 as the workpiece. With this linear contact, the electrolysis current is uniformly distributed, and the urging force of the buff against the design surface is intensified, so that the buffing force is strong. Accordingly, the electrolysis composite-type buffing is efficiently performed with a relatively small current.

In the electrolysis composite-type buffing method thus constructed, a buff with an electrode is provided, and electrolyte is supplied to the portion between the electrode and the workpiece. Abrasive is added to the electrolyte supplied between the electrode and the workpiece. Accordingly, the abrasive used for buffing is continuously supplied to the contact area between the buff and the surface of the workpiece.

With the supply of the electrolyte, the abrasive is continuously refreshed, so that the interruption of the buffing occurs only infrequently.

Accordingly, in the electrolysis composite-type buffing method, the buffing can be continued for a long time using the fresh abrasive continuously supplied. A good finished face can be obtained in a continuous manner, thus leading to improved efficiency.

Yet another embodiment of the present invention will be described below. This embodiment is directed to a mirror-polished aluminum alloy blank in which the surface is buffed into a mirror surface having a surface roughness of not more than 1 μm in the center-line average roughness.

Extremely accurate finishing work is required in order to polish the surface of a metal blank into a mirror surface having a surface roughness of not more than 1 μm in the center-line average roughness. The blank to be mirror polished must be homogenous.

Before an aluminum alloy blank is finished into a mirror surface, a preliminary process is performed on the aluminum alloy blank in the following manner. The blank is subjected to a predetermined heat treatment, the hardness of the resultant blank is inspected, and the homogenous aluminum alloy blank to be mirror finished is obtained.

However, the mirror finishing work for the homogenous aluminum alloy blank frequently fails to form a mirror finished surface. The mirror finishing work is expensive and yields poor results.

The inventors have discovered the fact that presence of the crystallized-out phase, such as the compound phase, crystallized out into spaces among dendrite arms in the surface region of the blank, greatly influences the formation of a mirror surface. On the basis of this discovery, the inventor reached the technical idea of the present invention that the limiting of the crystallized-out phase within a predetermined range provides an aluminum alloy blank which can reliably be finished into a mirror surface.

The embodiment of the present invention to be given hereinafter, which is based on the above-mentioned technical idea, remarkably reduces the occurrence of such an adverse situation such that mirror finishing is now cost effective.

To this end, the present embodiment sets a mean value of the secondary dendrite arm spacings (referred to as DAS2) in the surface region of an aluminum alloy blank to be mirror finished, to a value of not more than 40 μm. The metal structure of most industrial aluminum alloy blanks consists of the dendrite phase and the crystallized-out phase crystallized out into spaces among the dendrite arms. The crystallized-out phase has a larger hardness than the dendrite. When a blank is buffed for the mirror finishing, the finishing working of the dendrite more efficiently progresses than that of the crystallized-out phase. As a result, the dendrite phases are curved downward to form depressions in the surface region as viewed in cross section.

If the mean value of the DAS2 in the surface region of an aluminum alloy blank to be mirror finished is set to a value of not larger than 40 μm, the spaces among the crystallized-out phases of larger hardness are reduced. In the surface region of the blank of which the mean value of the DAS2 is so selected, excessive working of the dendrite portions is prevented or minimized. Accordingly, the surface of the dendrite portions is only slightly curved downward to form shallow depressions, so that a reliable mirror finishing is ensured.

The present embodiment will be described in detail with reference to FIGS. 16 through 18, and then a specific example will be presented as a confirmation test.

Figure 16:
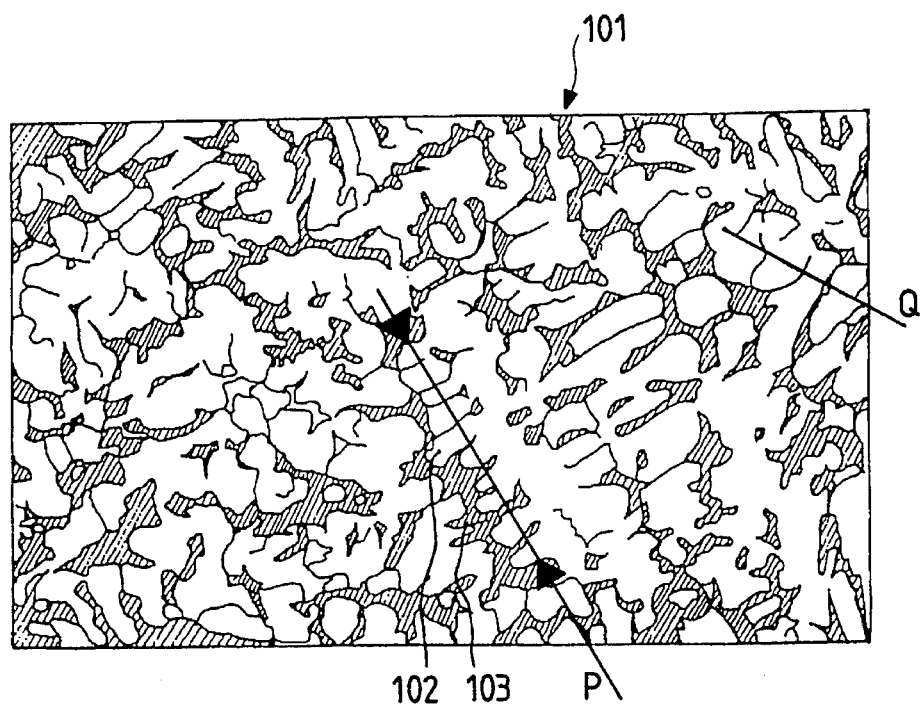
FIG. 16 is a diagram of the metal structure of the surface of an aluminum alloy blank.
Figure 17:
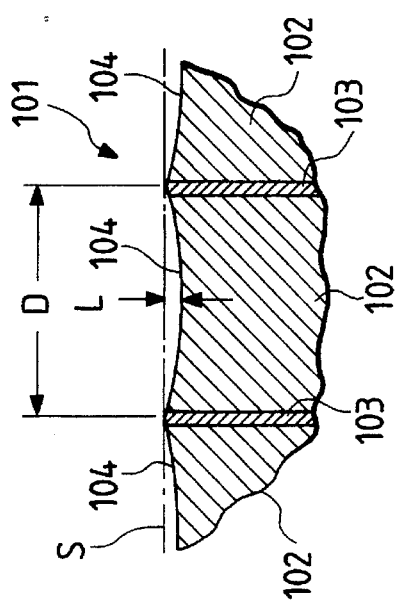
FIG. 17 is a cross sectional view of a model of a portion of the cross section of the metal structure shown in FIG. 16.

In FIG. 16, reference numeral 101 designates an aluminum alloy blank to be mirror finished (referred to as a blank); numeral 102, dendrite cells; and 103, crystallized-out phases. The crystallized-out phases 103 are crystallized out to fill the spaces among the dendrite cells 102.

The crystallized-out phases 103 contain Si and Mg as additives, which are harder than the minute spacial areas within the dendrite cells 102.

In mirror finishing the surface of the blank 101 by buffing, the buff coated with a compound buffs the surface so that the buff is in contact with both the minute spacial areas within the dendrite cells 102 and the crystallized-out phases 103.

As stated above, the crystallized-out phases 103 are harder than the minute spacial areas within the dendrite cells 102. Conversely, the minute spacial areas within the dendrite cells 102 are more soft than the crystallized-out phases 103. Accordingly, the efficiency of buffing the minute spacial areas within the dendrite cells 102 is different from that of buffing the crystallized-out phases 103. The finished surface of the blank 101 is shaped in a cross section such that the portions of the crystallized-out phases 103 protrude, while the minute spacial areas within the dendrite cells 102 are curved downward to form depressions 104 (see FIG. 17). In FIG. 17, S denotes a phantom straight plane S of the surface of the blank 101.

Therefore, it is seen that to reliably form a mirror surface by mirror finishing, the distance or depth L ranging from the top of the crystallized-out phase 103 to the bottom of the depression 104 must be reduced.

In connection with this, reduction of the cell size D of the dendrite cells 102 leads to the reduction of the depth L. The cell size reduction is very effective in the case of forming the mirror surfaces of 1 μm or less in surface roughness, particularly 0.4 μm or less. In this specification, the surface roughness means the center line average roughness Ra.

Figure 18:
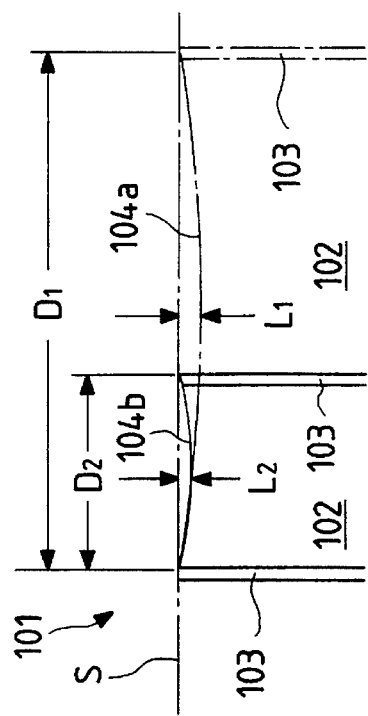
FIG. 18 is an explanatory diagram showing the relationship between the DAS2 of the aluminum alloy blank after being mirror finished and the surface roughness.

In FIG. 18, after a blank in which the cell size of the dendrite cells 102 is D1 is subjected to a predetermined mirror finishing, the crystallized-out phases 103 are left as stated above, and large depressions 104a of depth L are formed at the dendrite cells 102.

When the dendrite cells 102 are reduced to have the cell size D2, which is smaller than the cell size D1, small depressions 104b of the same curvature as that of the large depressions 104a are formed in the spaces surrounded by the crystallized-out phases 103 since the mirror finishing tool, for example, a buff, is soft. In this case, the depth L2 of the small depressions 104b is smaller than that L1 of the large depressions 104a.

Accordingly, the surface roughness of the mirror-finished surface is improved by the amount L1–L2 simply by reducing the size of the dendrite cells 102 of the blank 101, viz., reducing the DAS2.

On this presumption, the following confirmation test was conducted for evaluating the finishing quality of the surface finished by a mirror finishing work.

In the confirmation test, an aluminum wheel blank 11 (referred to as an aluminum wheel) as an aluminum alloy cast product was used as a test piece. The design surface 11a of the aluminum wheel 11 was mirror finished.

In this specification, the design surface 11a means a surface which faces outward from a vehicle body and forms a part of the overall appearance of a vehicle when the wheel is mounted on the vehicle. An aluminum wheel 11 as a test piece was a cast product obtained by pouring a molten aluminum (for example, AC4CH) alloy into a mold having a predetermined shape. The cast product is subjected to a heat treatment (T6). The cast product was machined into a predetermined shape after removal of the mill scale.

Figure 19:
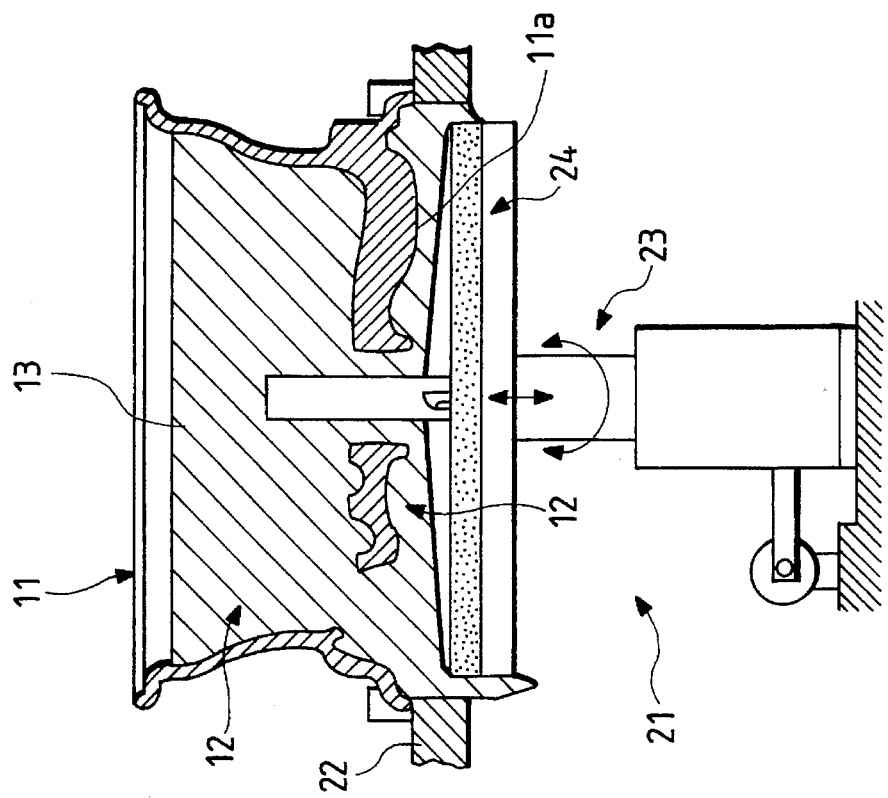
FIG. 19 is a side view, partly in cross section, showing how an aluminum alloy blank as a test piece is barrel worked.

Thereafter, the surface of the aluminum wheel 11, which includes the design surface 11a, was barrel worked in such a way as shown in FIG. 19.

In FIG. 19, reference numeral 21 designates a barrel polishing apparatus, and numeral 22 represents a work table 22. A push plate 24 is disposed facing an opening located at the central part of the work table 22.

The push plate 24 is driven to move vertically and angularly (as indicated by arrows marked in the central part in FIG. 19) in a reciprocative manner by a drive unit 23, thereby causing a barrel polished mixture 13 (to be described later) to be in motion.

The aluminum wheel 11 is fastened to the circumferential edge of the upper side of the hole of the work table 22. The aluminum wheel 11 is filled with the barrel polished mixture 13 formed by mixing work liquid, media, and compound at a proper ratio. A polishing chamber 12 is formed between the push plate 24 and the inner surface of the aluminum wheel 11. The surface of the aluminum wheel 11, which includes the design surface 11a, is barrel worked by driving the push plate 24.

In the barrel working of the aluminum wheel 11 as the test piece by the barrel polishing apparatus 21, the work liquid was water, the media was steel balls of the diameter approximately 0.8 to 1.2 mm, and the compound contained lubricating oil and soap. The amplitude and the frequency of the vertical and angular motions were 4.5 mm or less and 1000 to 2000 Hz respectively.

The aluminum wheel 11 as the test piece was formed by barrel working the surface of the blank in this way.

Three aluminum wheels 11, which contain the dendrite cells of different cell sizes in the surface regions thereof, were formed as test pieces under different conditions of heat treatment.

To distinguish the different aluminum wheels 11 from one another, one was identified as test piece A, another as test piece B and a third as test piece C.

Test piece A is an aluminum wheel in which the DAS2 in the surface region of the design surface 11a to be mirror finished was adjusted to a value of 30 μm in average. In test piece B, the DAS2 was adjusted to 40 μm, and in the test piece C it was adjusted to 50 μm.

To check as to whether or not the DAS2 of the test pieces A to C were adjusted to the above figures, the surfaces of the test pieces A to C to be mirror finished were examined at a number of different locations. The metal structure of the surfaces of the samples were photographed using an optical microscope. Using the photographs, DAS2 of the samples were measured according to the secondary technique of the dendrite arm spacing measuring procedure, which is employed in the Light Metal Academy.

Figure 20:
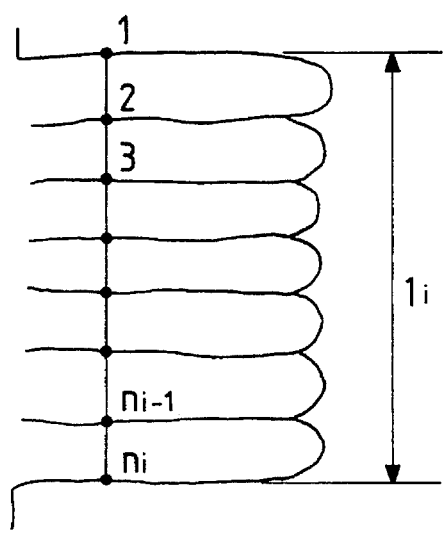
FIG. 20 is a diagram illustrating the method of measuring DAS2 based on a secondary technique.

The DAS2 measuring procedure used will be described with reference to FIGS. 16 and 20.

1) Portions to be measured are selected from the metal structure photographs.

In selecting the measured portions, at least three aligned dendrite secondary arms must be contained in each measured portion selected.

Accordingly, in the case of the metal structure shown in FIG. 16, a portion denoted as P is selected an the measured portion. A portion denoted as Q is unsuitable for the measured portion.

On the photograph, the length li between the boundary of the aligned dendrite secondary arm group and another boundary thereof is selected on the basis that the dendrite secondary arms or the arms recognized as the secondary arms are aligned. Further, the intersection number ni when a line is drawn from the boundary of the aligned dendrite secondary arm group to another boundary thereof is counted (see FIG. 20).

In this way, the length li and the intersection number ni are measured, and the total number of dendrite secondary arms to be measured must be 30 or more. The measurement as mentioned above is carried out on the m number of the dendrite secondary arm groups satisfying the above conditions.

When the following equation is calculated using the thus measured values, we can obtain the secondary dendrite arm spacing d by the secondary technique.

$$d = \frac{l_1 + l_2 + \ldots + l_m}{(n_1-1)+(n_2-1)+\ldots+(n_m-1)} = \frac{\Sigma l_i}{\Sigma n_j - m}$$

The thus calculated mean values of the DAS2 of the test pieces A to C were: 30.0 μm for the test piece A, 38.3 μm for the test piece B, and 49.0 μm for the test piece C.

As seen, the DAS2 values of those test pieces A to C are approximately equal to the intended values.

The three test pieces A to C were subjected to a predetermined mirror finishing by using the same buff and the same compound and under the same polishing load.

When the time for mirror finishing is fixed, there is a possibility that the finishing is influenced by the result or the barrel working as the preliminary step for the test pieces A to C. Accordingly, the time for mirror finishing was not limited. That is, the mirror finishing work was terminated when the best finished surfaces of the test pieces A to C were obtained.

The surface roughness of the test pieces A to C thus mirror finished was 1 μm or less. Accordingly, the evaluation of the finished surfaces of the test pieces A to C was conducted by comparing them with the mirror surface samples, which were carefully formed using AC4C materials. The evaluation by comparison was visually conducted by ten persons.

The results of the evaluation are tabulated in Table 2.

TABLE 2

| observer | a | b | c | d | e | f | g | h | i | j |
|---|---|---|---|---|---|---|---|---|---|---|
| testpiece A | 5 | 5 | 5 | 5 | 5 | 5 | 5 | 5 | 5 | 5 |
| testpiece B | 4 | 5 | 5 | 5 | 5 | 4 | 4 | 5 | 5 | 5 |
| testpiece C | 3 | 4 | 4 | 4 | 5 | 4 | 3 | 4 | 4 | 5 |

The evaluation was based on a maximum of 5 points. Accordingly, in Table 1, "5" indicates that the quality of the finished surface is comparable with that of the sample. "4" indicates that the former is slightly inferior to the latter. "3" indicates that the former is considerably inferior to the finished surface quality indicated by the point "4".

As seen from Table 1, all of the observers confirmed that the quality of the finished surface of the test piece A having the DAS2 mean value of 30 μm is comparable with that of the sample.

70% of the observers determined the finished surface quantity of the test piece B having the DAS2 mean value of 40 μm to be comparable with that of the sample, but the remaining 30% of the observers found the former to be somewhat inferior to the latter.

The evaluation is based on the visual comparison by the observers. Accordingly, the evaluations by the observers are not invariable. When this fact is taken into consideration, it can be considered that the quality of the finished surface of the test piece B is also comparable with that of the sample.

20% of the observers determined the finished surface quantity of the test piece C having the DAS2 mean value of 50 μm to be comparable with that of the sample, but 60% of the observers found the former to be somewhat inferior to the latter, and 20% of the observers found that the former is considerably inferior to that of the sample. Accordingly, the finished surface quality of the test piece C is considered to be somewhat inferior to that of the sample.

As seen from the results of the evaluations of the test pieces A to C, the quality of the finished surface of the aluminum alloy blank is better as the mean value of the DAS2 is smaller.

From the table, it is further seen that if the cell size of the dendrite cell in the surface region of the aluminum alloy blank is adjusted to 40 μm or less in the mean value, the resultant mirror surface is extremely excellent, having a surface roughness of 1 μm or less, particularly 0.4 μm or less.

Thus, when the aluminum alloy blank of the invention in which the mean value of the DAS2 in the surface region of the aluminum alloy is adjusted to 40 μm or less, is used, the work of finishing the design surface of the blank into an excellent mirror surface is more reliable than when the conventional blank is used. Accordingly, the mirror finishing work performed on such blanks is more cost effective and produces better results.

As seen from the foregoing description, the mean value of the DAS2 in the surface region of an aluminum alloy blank to be mirror finished is set to a value of not larger than 40 μm. Because of this, the spaces among the crystallized-out phases of larger hardness are reduced. In the surface region of the blank of which the mean value of the DAS2 is so selected, excessive working of the dendrite portions is controlled to a minimum. Accordingly, the surface of the dendrite portions is slightly curved downward to form shallow depressions, so that reliable mirror finishing is ensured.

Accordingly, mirror finishing work can be performed cost effectively.

A vehicle wheel according to a further embodiment of the present invention will be described below. The vehicle wheel is made of aluminum alloy, particularly aluminum alloy containing Si. The aluminum alloy vehicle wheel contributes to the overall appearance of the vehicle when it is mounted on the vehicle. The surface of the wheel, which faces outward from the vehicle body, is one of the key factors in vehicle design.

Various types of well designed uneven portions, such as spoke portions, are formed in a disk portion forming this design surface.

The vehicle wheel may be classified into a vehicle wheel of the type in which a wheel body and a rim portion are separately formed and then are coupled into a one piece construction by means of welding, rivets, or the like, and a vehicle wheel of the one piece type in which the disk portion is integral with the rim portion. The one-piece type vehicle wheel is generally made of aluminum alloy containing Si and formed through casting.

The design surface of the one-piece type vehicle wheel has uneven portions. Further, Si particles are crystallized out in the material. Accordingly, the design surface has a large surface roughness and poor glass.

For the above reasons, the beneficial design features that the design surface of the aluminum alloy vehicle wheel possess have not been fully utilized.

When the vehicle wheel is mounted on the vehicle, the design surface faces outward from the vehicle body and is light reflective. Accordingly, the design surface can improve the appearance of a vehicle. This feature of the design surface may be utilized for improving the safety of the vehicle as well. However, the level of gloss of the design surface of the wheel is not presently used for effecting such potential capabilities.

The present embodiment of the invention is capable of making full use of the useful design features of the design surface of the aluminum alloy vehicle wheel, and of intensifying the reflecting light from the design surface, thereby improving the visual recognition when seen from the side of the vehicle, and hence improving safety.

To this end, this embodiment is constructed on the basis of a technical idea that in an aluminum alloy vehicle wheel of the type in which the rim portion and the disk portion are coupled into a one-piece construction by casting, the surface roughness of the design surface, which is formed on the outer side of the disk portion, is set to 3 μm or less in the center-line average roughness.

Since the surface roughness of the design surface is set to 3 μm or less in the center-line average roughness, the resultant design surface is more glossy than that of the conventional vehicle wheel. Accordingly, the potential useful design feature can be brought into full play, remarkably improving the appearance of the vehicle.

Further, the visual recognition when seen from the side of the vehicle is improved, thereby providing increased safety of the vehicle.

The embodiment will be described in detail with reference to the accompanying drawings.

Figure 23:
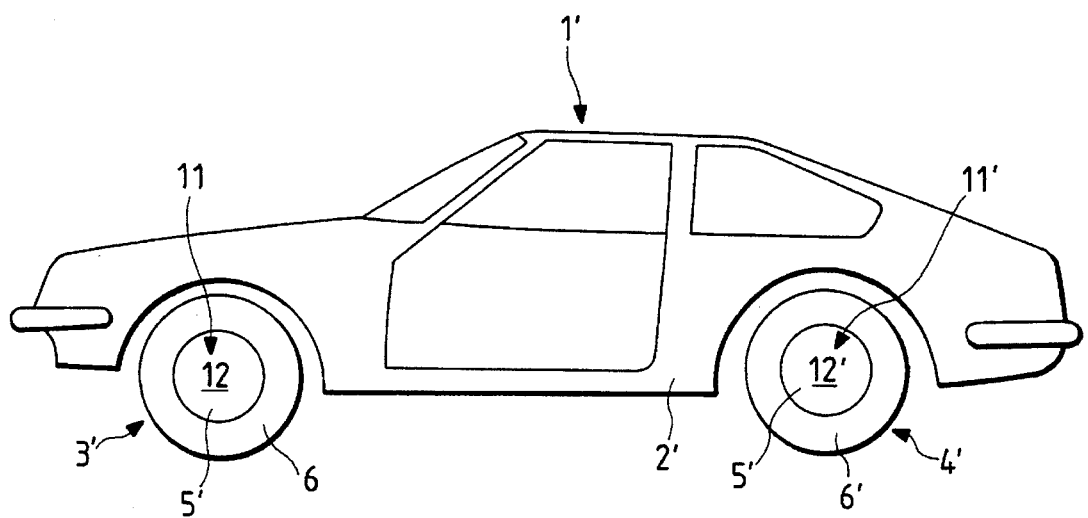
FIG. 23 is a side elevational view of a vehicle.

In FIG. 23, reference numeral 1' designates a vehicle; numeral 2', a vehicle body; 3', a front wheel; and 4', a rear wheel.

The front and the rear wheels are formed by fastening the vehicle wheels 5' (referred to as a wheel) of this embodiment on the axles (not shown). A tire 6' is mounted on the circumferential outer surface of the rim portions, which is also mounted on the circumferential outer surface of the wheel 5' of each of the front and rear wheels. The design surface in the disk portion of the wheel 5' is directed toward the outside of the vehicle body 2'.

Figure 21:
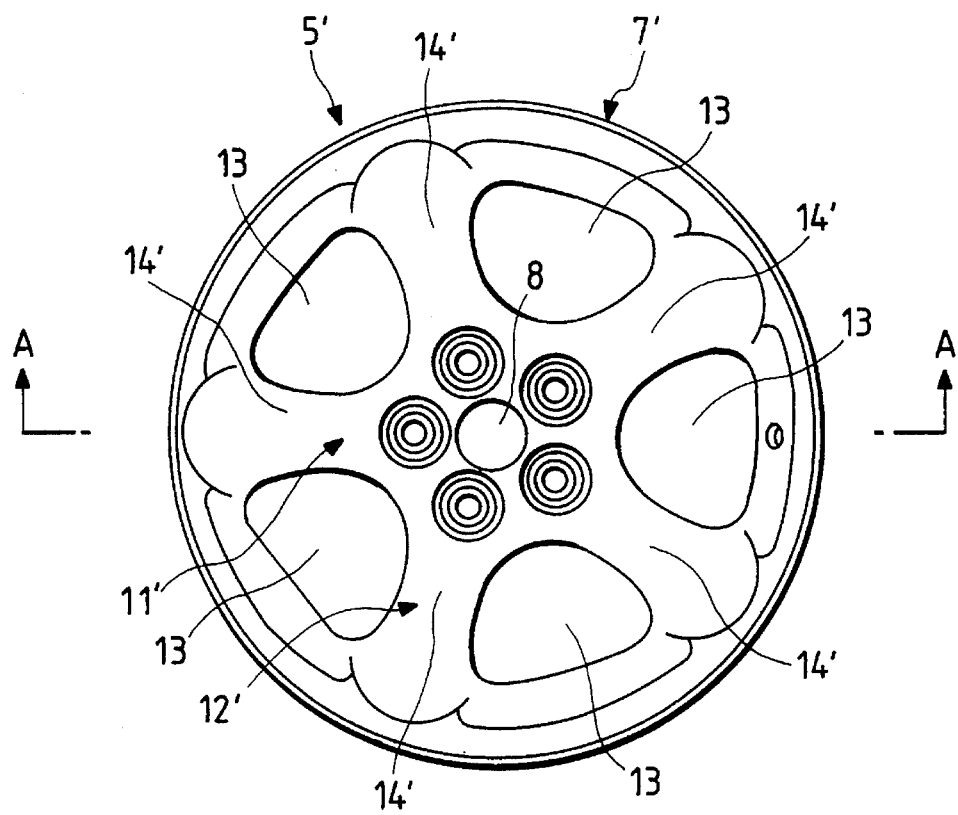
FIG. 21 is a front view of a vehicle wheel.
Figure 22:
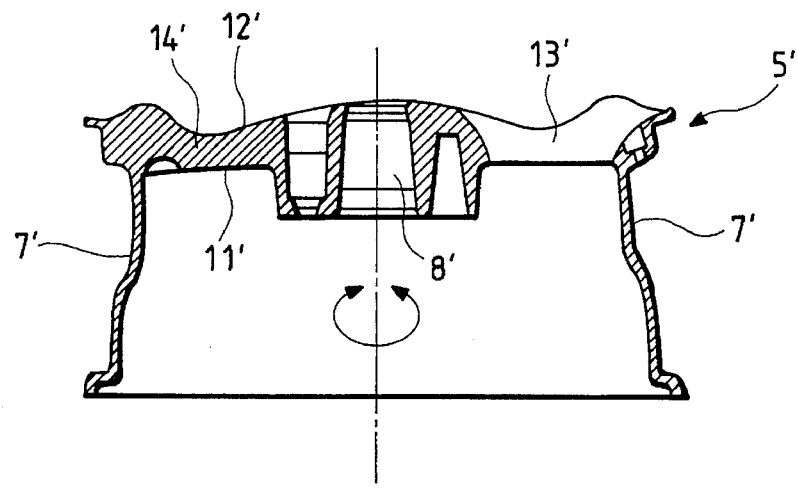
FIG. 22 is a cross sectional view taken along line A—A in FIG. 21.

The wheel 5' thus mounted on the vehicle 1' will be described with reference to FIGS. 21 and 22.

The wheel 5' is a one-piece wheel formed by casting.

The wheel 5' is a cast product obtained by pouring a molten aluminum (for example, AC4CH) alloy into a mold having a predetermined shape. The cast product is taken out of the mold and subjected to a machining process after removal of gate portions. Through the machining process, the dimensional accuracy required for the vehicle wheel is obtained. Thereafter, the cast product is subjected to a process of barrel working, and the design surface 12' is finished by buffing as will be described later. The finished surface of the design surface 12' is smooth and glossy.

The wheel 5' is formed of a ring-like rim portion 7' formed on the circumferential outer surface of the wheel 5', a hub portion 8 and 8', located at the central portion of the wheel 5', for fastening the wheel to the axle, and a disk portion 11' coupling the hub portion 8' with the rim portion 7'.

The outside surface of the vehicle disk 11' of the wheel 5' is the design surface 12' from a design point of view. The design surface 12' of the wheel 5' includes through holes 13' and spoke portions 14' which are shaped in conformity with a corresponding shape formed on the molding surface of the mold cavity when the wheel 5' is molded.

The surface of the design surface 12' of the wheel 5' has a complicated shape including variously curved portions and planar portions.

The design surface 12', once finished by the buffing, is an excellent finished surface having the surface roughness of 3 μm or less in the center-line average roughness Ra, and in more glossy than the conventional one.

The surface roughness of the design surface 12' is measured on a plural number of portions of the surfaces which are considered as the average finished surface, and an arithmetic mean is used.

In order to reliably obtain a good finished surface having a center-line average roughness Ra of 3 μm or less by buffing, the secondary dendrite arm spacing (referred to as DAS2)) in the surface region of the design surface 12' was measured. The mean value of the DAS2 was 40 μm or less.

The DAS2 measurement was conducted in the following way. The surface of the design surface 12' were measured at a plural number of locations thereon, to obtain samples. The metal structure (FIG. 16) of the surfaces of the samples were photographed with an optical microscope. Using the photographs, DAS2 of the samples were measured according to the secondary technique of the dendrite arm spacing measuring procedure, which is employed in the Light Metal Academy.

The DAS2 measuring procedure used will be described with reference to FIGS. 16 and 20.

In FIG. 16, reference numeral 101 indicates a photograph showing the metal structure on the design surface 12'; 102, a dendrite secondary arm; and 103, a crystallized-out phases corresponding to the Si particles.

When the mean value of the DAS2 in the surface region of the design surface 12' is 40 μm or less as stated above, a good finished surface having the surface roughness of 3 μm or less can be relatively easily formed by subjecting the design surface 12' to a predetermined process of buffing.

When the mean value of the DAS2 in the surface region of the design surface 12' is 50 μm or less, a finished surface having the surface roughness of 3 μm or less can be formed reliably enough to be used in the present mass production technique. In this case, the reliability of forming such a finished surface is inferior to that of the 40 μm DAS2 case.

In the wheel 5' having the design surface 12' finished up to 3 μm or less in the surface roughness, the design surface 12' is more glossy than the conventional one.

Accordingly, the uneven design of the design surface 12' is emphasized by the gloss, so that the external design features of the design surface 12' are brought into full play. Accordingly, the external view of the vehicle 1' is much improved.

The reflecting light from the design surface 12' is intensified, improving the visual recognition when seen from the side of the vehicle. The design surface 12' will intensively reflect light from the head lamp of a vehicle 1' coming from the side, such as at an intersection, particularly at night. Therefore, it contributes to the safety of the vehicle.

As can be seen from the foregoing description, since the surface roughness of the design surface is set to 3 μm or less in the center-line average roughness, the resultant design surface is more glossy than that of the conventional vehicle wheel. Accordingly, all of the potential useful design features can be brought into full play, remarkably improving the appearance of the vehicle. Further, the visual recognition when seen from the side of the vehicle is improved, thereby providing increased safety of the vehicle.

What is claimed:

1. An aluminum alloy article which is to be provided with a mirror-finish, characterized in that a mean value of dendrite secondary arm spacing in a surface region of said article is not greater than about 40 μm.

2. A cast vehicle wheel having a rim portion and a disc portion formed integrally with said rim portion, said cast vehicle wheel comprising an aluminum alloy containing silicon, characterized in that a surface roughness of a design surface of said cast vehicle wheel is less than or equal to about 3 μm in centerline mean surface roughness, and wherein a mean value of dendrite secondary arm spacing in a surface region of said cast vehicle wheel is less than or equal to about 40 μm.

3. An aluminum alloy blank article as recited in claim 1, wherein the mean value of dendrite secondary arm spacing is calculated according to the following equation:

$$d=(l_1+l_2+\ldots+l_m)/((n_1-1)+(n_2-1)+\ldots(n_m-1))=\Sigma l_j/(\Sigma n_j-m)$$

where d=the secondary dendrite arm spacing; l=the length between the boundary of the aligned dendrite second arm group and another boundary thereof; n=the number of intersections when a line is drawn from the boundary of the aligned dendrite secondary arm group to another boundary thereof; and m=the number of dendrite secondary arm groups, where m is at least 30.

* * * * *